(12) United States Patent
Konuma et al.

(10) Patent No.: US 10,331,552 B2
(45) Date of Patent: Jun. 25, 2019

(54) STORAGE DEVICE AND MEMORY SYSTEM

(71) Applicant: Toshiba Memory Corporation, Minato-ku (JP)

(72) Inventors: Isao Konuma, Sagamihara (JP); Norikazu Yoshida, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 956 days.

(21) Appl. No.: 14/833,280

(22) Filed: Aug. 24, 2015

(65) Prior Publication Data

US 2016/0267012 A1 Sep. 15, 2016

Related U.S. Application Data

(60) Provisional application No. 62/130,923, filed on Mar. 10, 2015.

(51) Int. Cl.
*G06F 12/00* (2006.01)
*G06F 12/02* (2006.01)

(52) U.S. Cl.
CPC ............ *G06F 12/0246* (2013.01); *G06F 2212/1016* (2013.01); *G06F 2212/7201* (2013.01)

(58) Field of Classification Search
CPC ......... G06F 12/0246; G06F 2212/1016; G06F 2212/7201
See application file for complete search history.

(56) References Cited

U.S. PATENT DOCUMENTS

| 8,612,666 | B2 | 12/2013 | Royer, Jr. et al. |
| 2010/0332730 | A1 | 12/2010 | Royer, Jr. et al. |
| 2013/0073897 | A1 | 3/2013 | Khmelnitsky |
| 2013/0151754 | A1 | 6/2013 | Post et al. |
| 2013/0191609 | A1 | 7/2013 | Kunimatsu et al. |

FOREIGN PATENT DOCUMENTS

| JP | 2013-33337 | 2/2013 |
| JP | 2013-65308 | 4/2013 |
| JP | 2013-137770 | 7/2013 |
| JP | 2013-206307 | 10/2013 |

*Primary Examiner* — Matthew Bradley
(74) *Attorney, Agent, or Firm* — Oblon, McClelland, Maier & Neustadt, L.L.P.

(57) ABSTRACT

According to one embodiment, a storage device includes a storage portion storing a first entry, the first entry includes a first translation table corresponding between a first logical address and a first physical address on a nonvolatile memory, and a first state showing that data at the first physical address is a valid as data at the first logical address, and a controller adding a second entry in the storage portion and changing the first state to a second state when receiving a command from a host, the second entry includes a second translation table corresponding between a second logical address and the first physical address, and a third state showing that the first physical address of the second translation table is referring to the first physical address of the first translation table, the second state showing that the first physical address of the first translation table is shared with the first physical address of the second translation table.

19 Claims, 28 Drawing Sheets

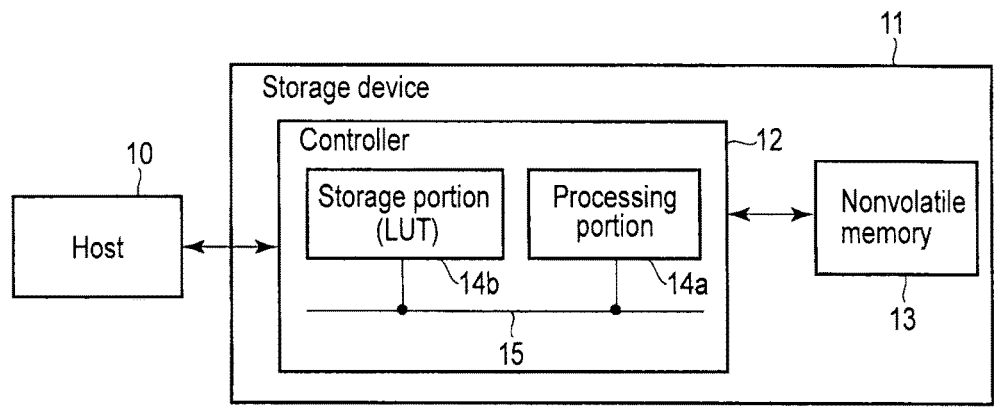
F I G. 1
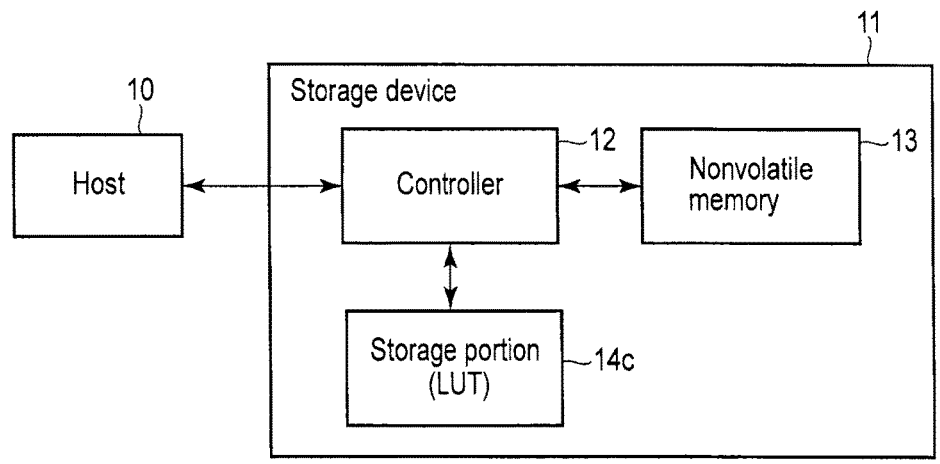
F I G. 2
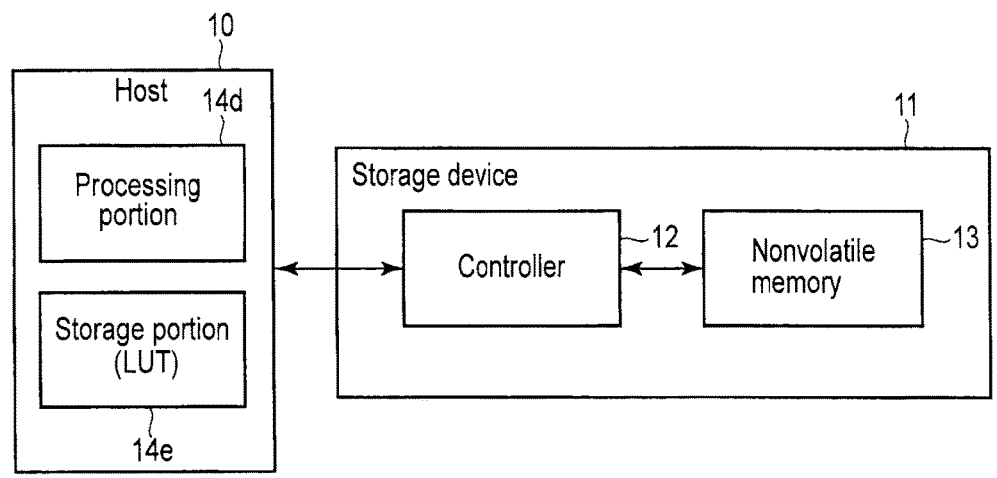
F I G. 3

| LUT | | | | |
|---|---|---|---|---|
| Entry No. | LA | PA | State | ~14b,14c,14e |
| 0 | la0 | pa0 | valid | |
| 1 | la1 | pa1 | valid | |
| ⋮ | ⋮ | ⋮ | ⋮ | |
F I G. 4
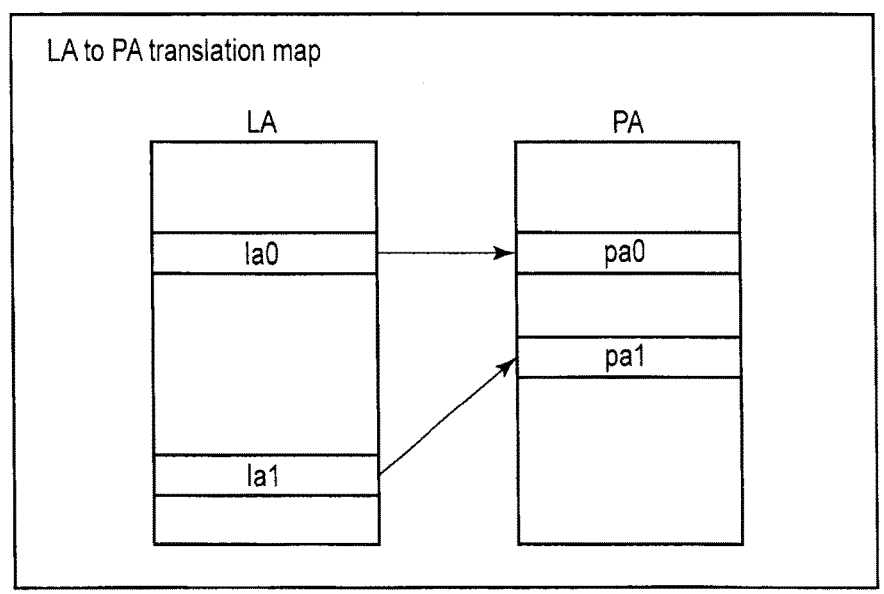
F I G. 5

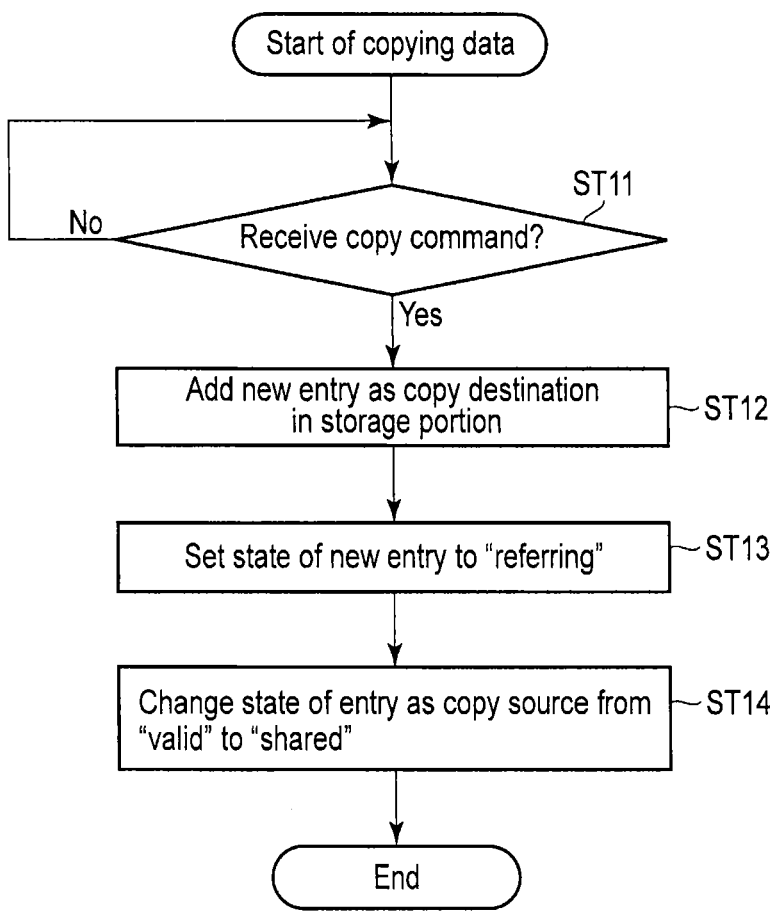
F I G. 6A

| LUT (After copying data) | | | | |
|---|---|---|---|---|
| Entry No. | LA | PA | State | ~14b,14c,14e |
| 0 | la0 | pa0 | shared | |
| 1 | la1 | pa0 | referring | |
| ⋮ | ⋮ | ⋮ | ⋮ | |
F I G. 7
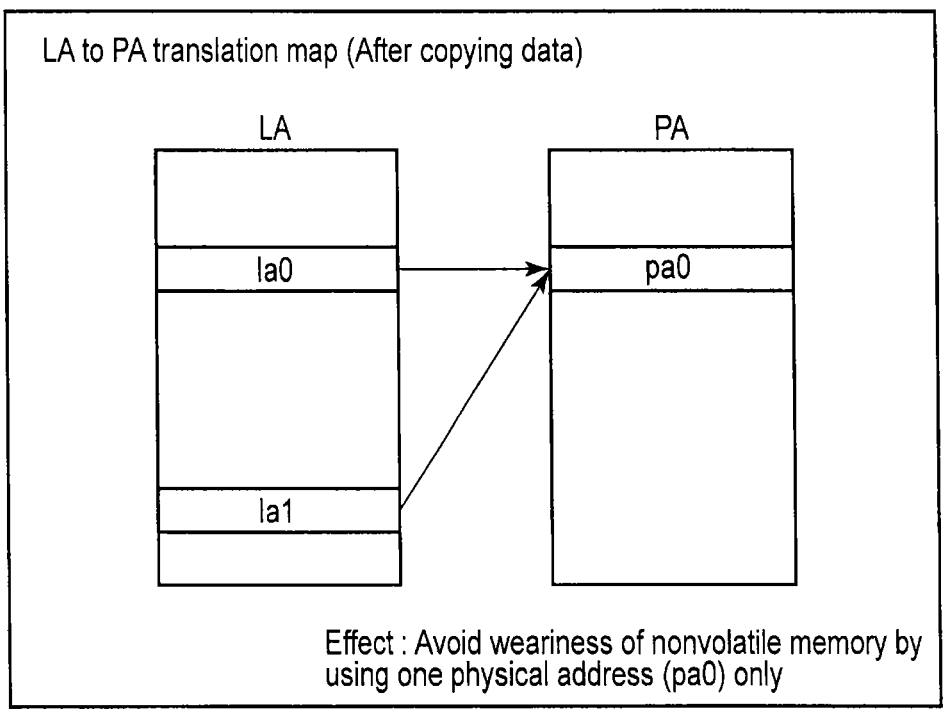
F I G. 8

| LUT (After overwriting la0) | | | | |
|---|---|---|---|---|
| Entry No. | LA | PA | State | ~14b,14c,14e |
| 0 | la0 | pa0 → pa1 | shared → valid | |
| 1 | la1 | pa0 | referring → valid | |
| ⋮ | ⋮ | ⋮ | ⋮ | |

| LUT (After overwriting la1) | | | | |
|---|---|---|---|---|
| Entry No. | LA | PA | State | ~14b,14c,14e |
| 0 | la0 | pa0 | shared → valid | |
| 1 | la1 | pa0 → pa1 | referring → valid | |
| ⋮ | ⋮ | ⋮ | ⋮ | |
F I G. 13
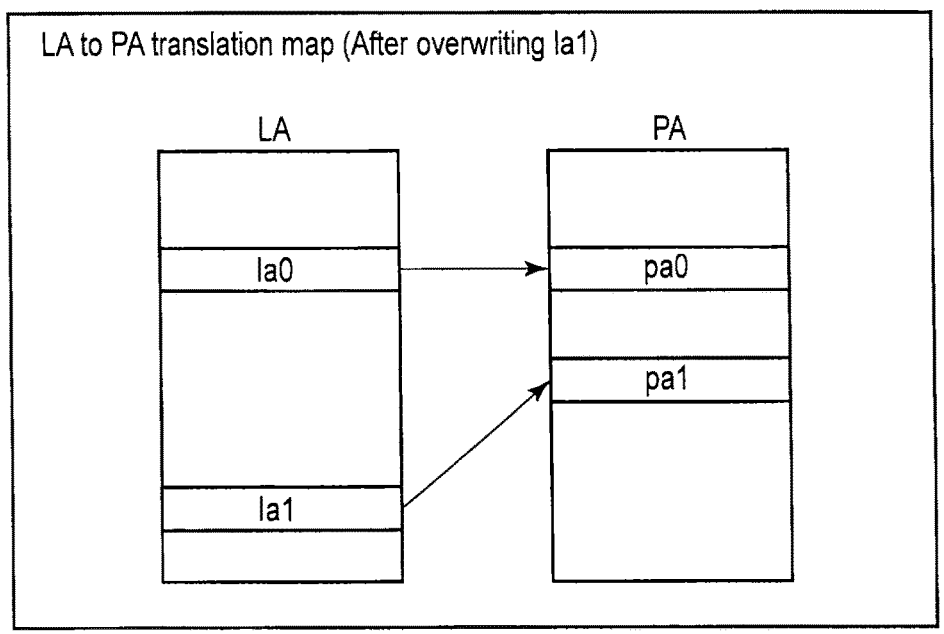
F I G. 14

| LUT | | | | | ~14b,14c,14e |
|---|---|---|---|---|---|
| Entry No. | LA | PA | State | Pointer | |
| 0 | la0 | pa0 | shared | No.1 | |
| 1 | la1 | pa0 | referring | No.0 | |
| ⋮ | ⋮ | ⋮ | ⋮ | ⋮ | |

F I G. 15A

| LUT | | | | | ~14b,14c,14e |
|---|---|---|---|---|---|
| Entry No. | LA | PA | State | Pointer | |
| 0 | la0 | pa0 → pa1 | shared → valid | No.1 | Change state of entry No.1 |
| 1 | la1 | pa0 | referring → valid | No.0 | |
| ⋮ | ⋮ | ⋮ | ⋮ | ⋮ | |

F I G. 15B

| LUT | | | | |
|---|---|---|---|---|
| Entry No. | LA | PA | State | Pointer |
| 0 | la0 | pa0 | shared → valid | No.1 |
| 1 | la1 | pa0 → pa1 | referring → valid | No.0 |
| ⋮ | ⋮ | ⋮ | ⋮ | ⋮ |

~14b, 14c, 14e

Change state of entry No.0

FIG. 15C

| LUT | | | | |
|---|---|---|---|---|
| Entry No. | LA | PA | Next pointer | ~14b,14c,14e |
| 0 | la0 | pa0 | 0 | |
| ⋮ | ⋮ | ⋮ | ⋮ | |

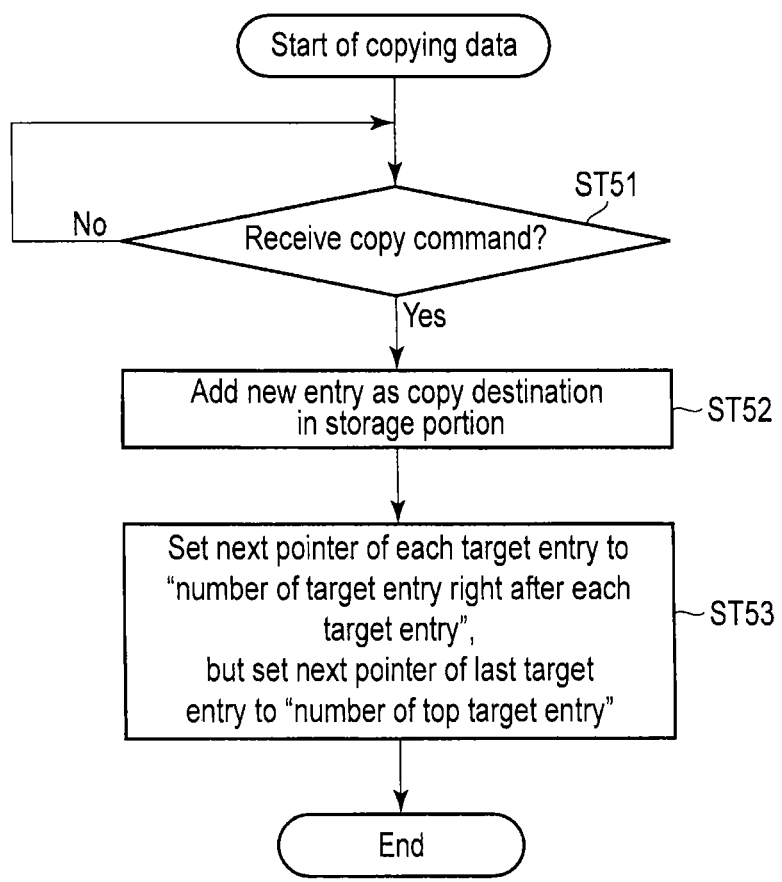
F I G. 18A

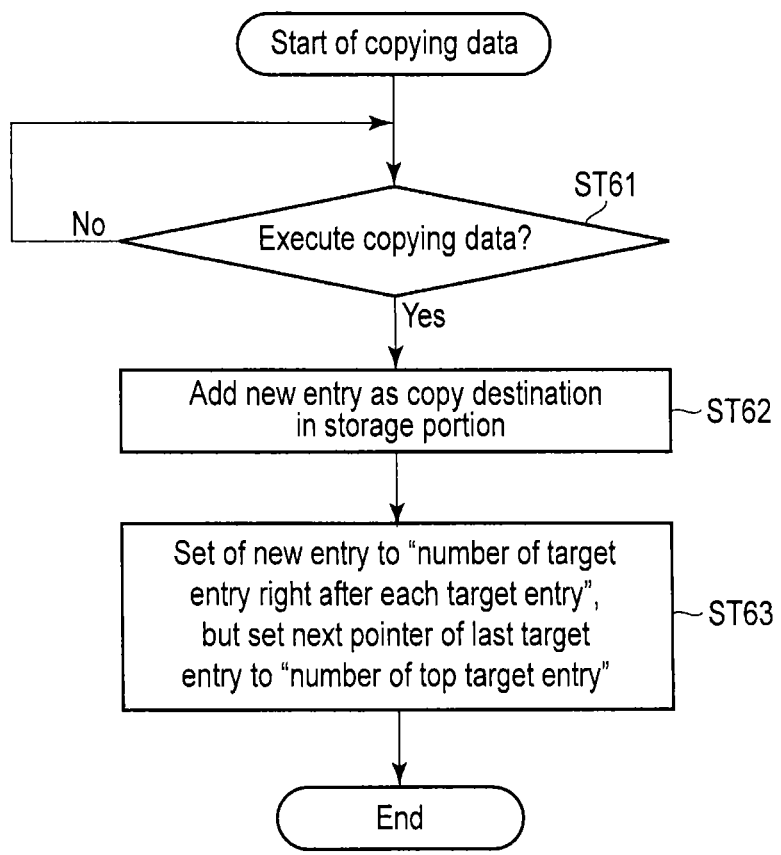
F I G. 18B

| LUT (After copying data) | | | | ~14b,14c,14e |
|---|---|---|---|---|
| Entry No. | LA | PA | Next pointer | |
| 0 | la0 | pa0 | 1 | |
| 1 | la1 | pa0 | 0 | |
| ⋮ | ⋮ | ⋮ | ⋮ | |
F I G. 19
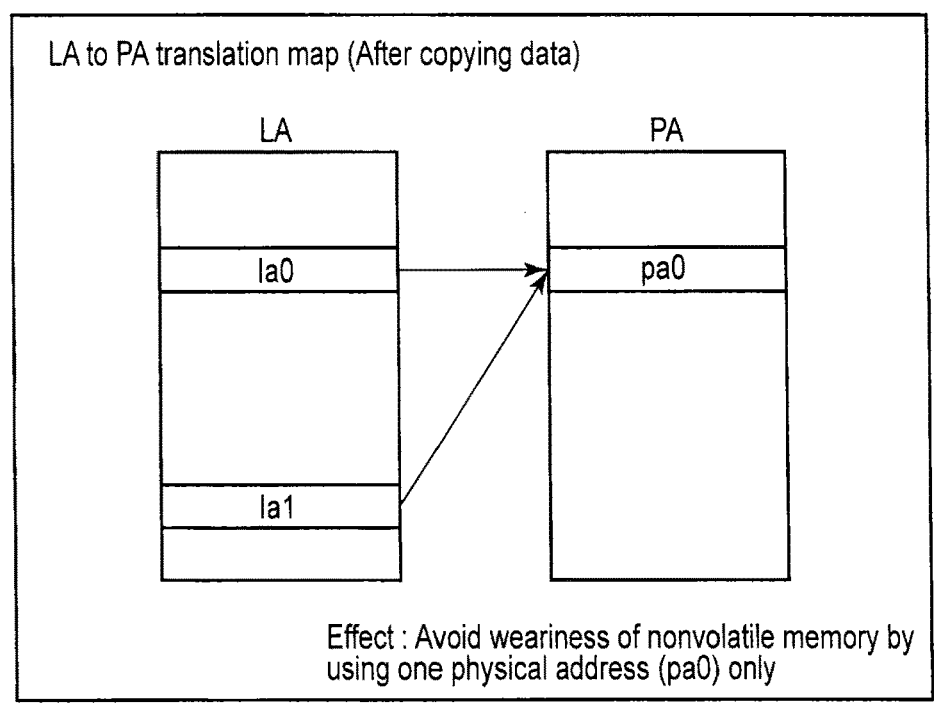
F I G. 20

| LUT (After overwriting la0) | | | | |
|---|---|---|---|---|
| Entry No. | LA | PA | Next pointer | ~14b,14c,14e |
| 0 | la0 | pa0 → pax | 1→ 0 | |
| 1 | la1 | pa0 | 0 →1 | |
| ⋮ | ⋮ | ⋮ | ⋮ | |
F I G. 22
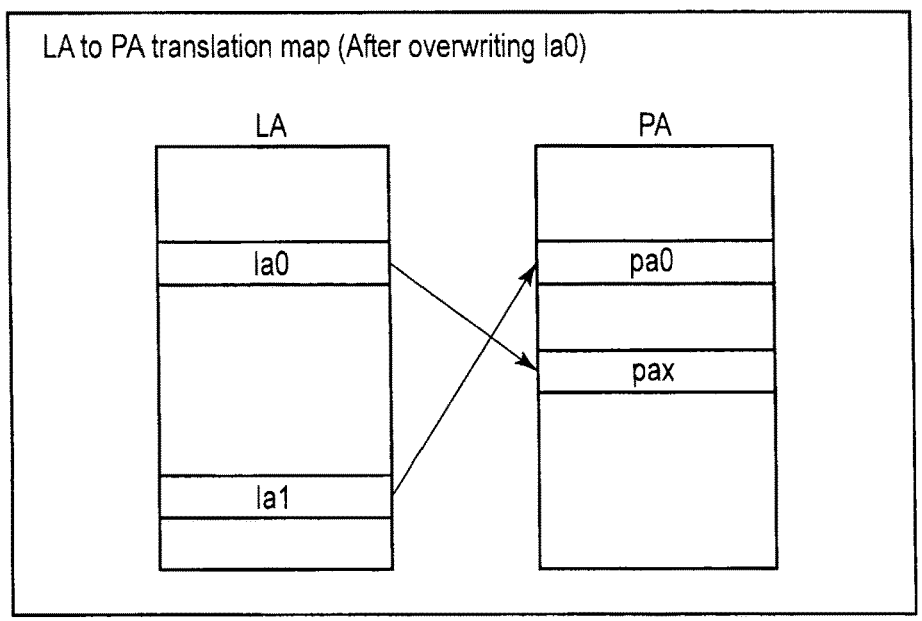
F I G. 23

| LUT (After overwriting la1) | | | | |
|---|---|---|---|---|
| Entry No. | LA | PA | Next pointer | ~14b,14c,14e |
| 0 | la0 | pa0 | 1→0 | |
| 1 | la1 | pa0 → pax | 0 →1 | |
| ⋮ | ⋮ | ⋮ | ⋮ | |
F I G. 24
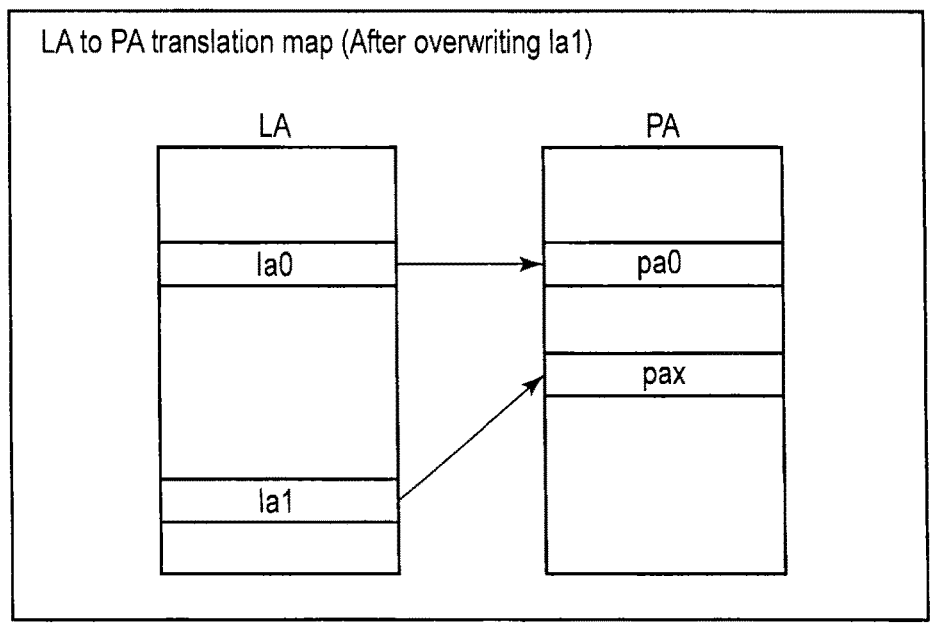
F I G. 25

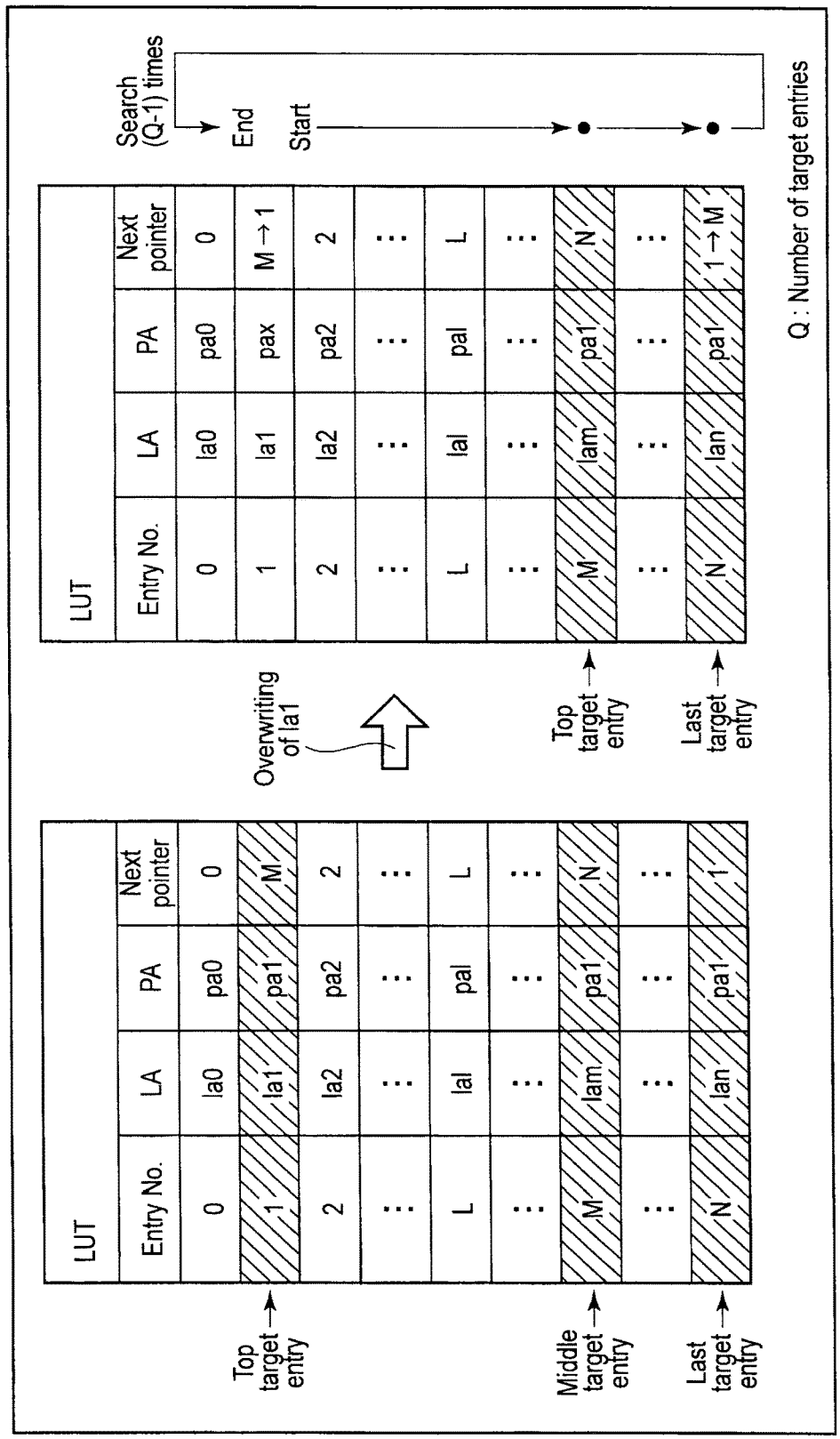
F I G. 28

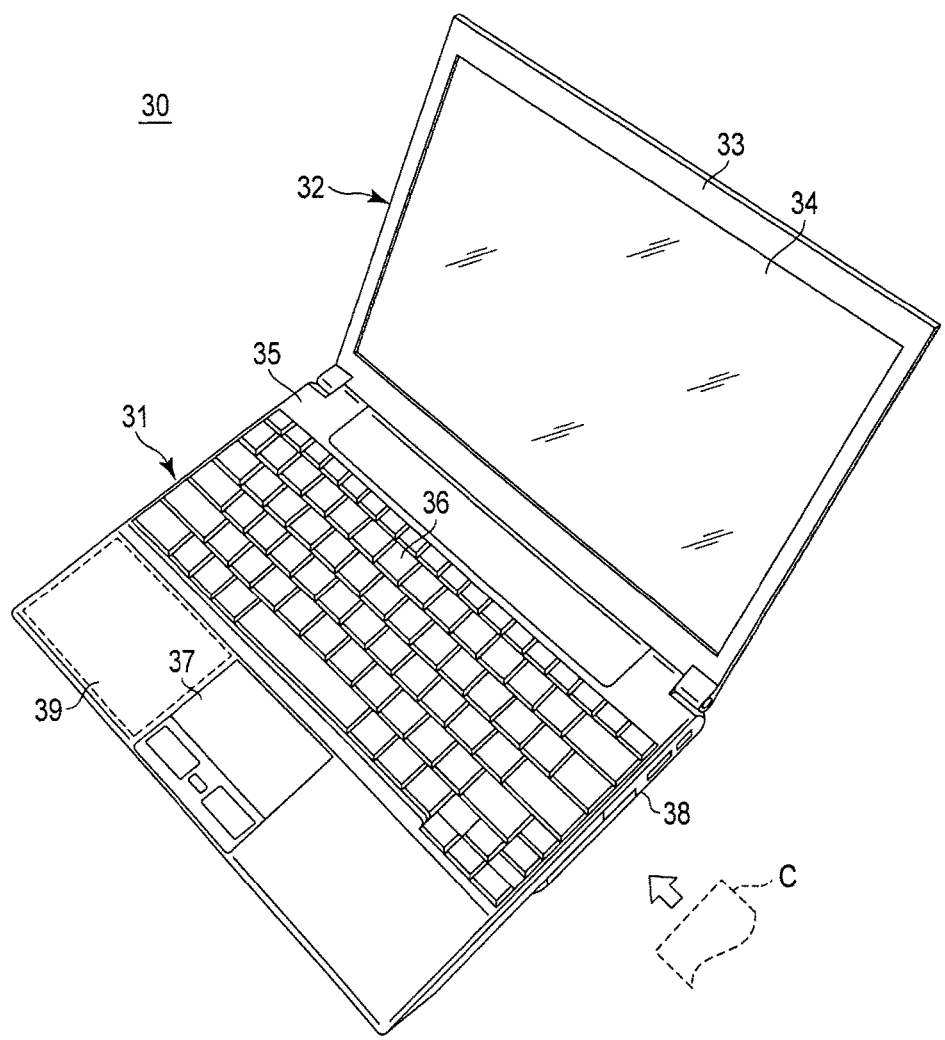
F I G. 31

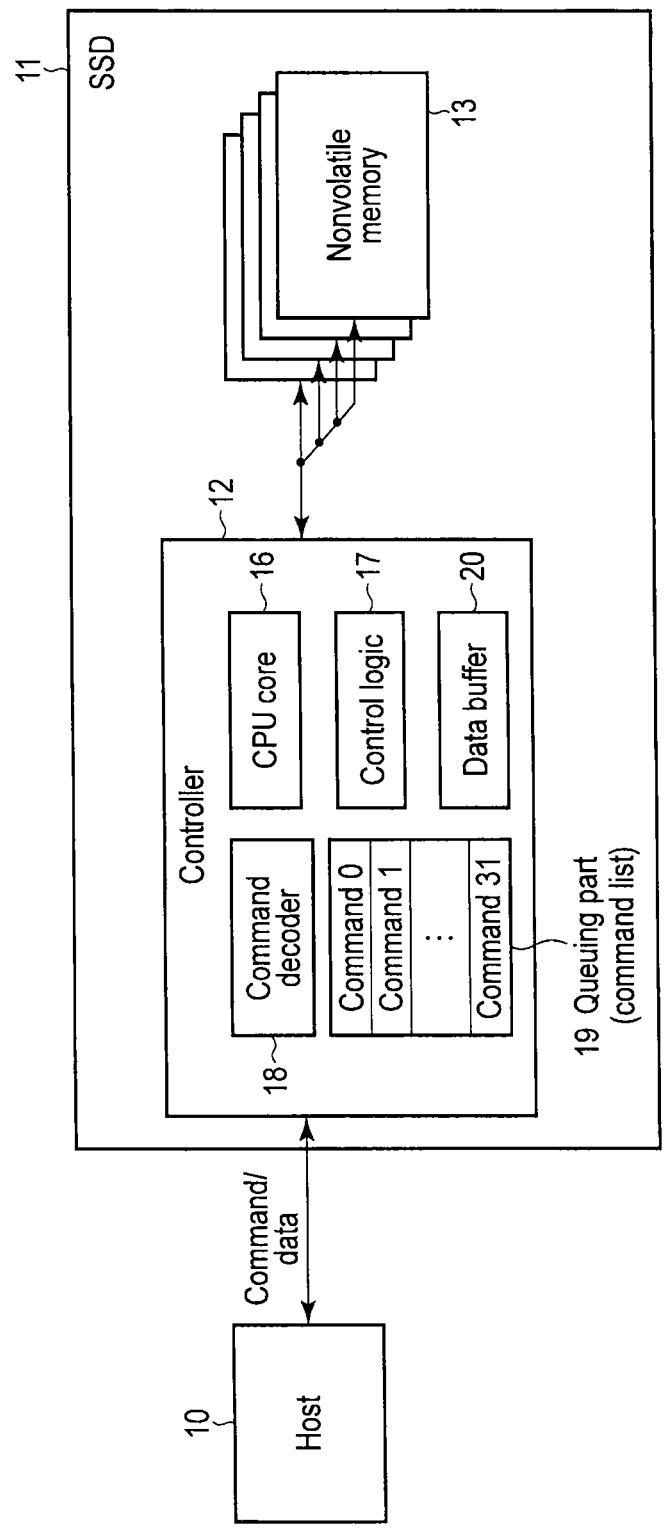
F I G. 32

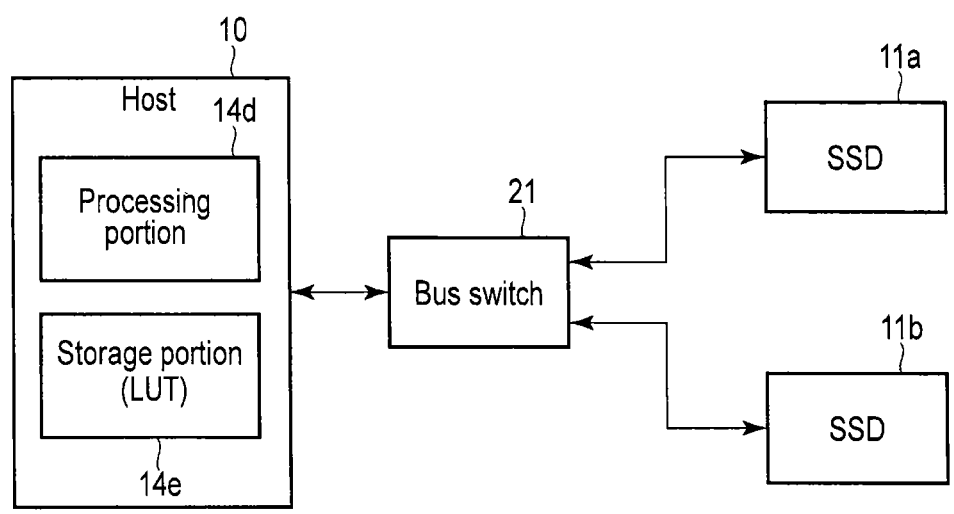
F I G. 33

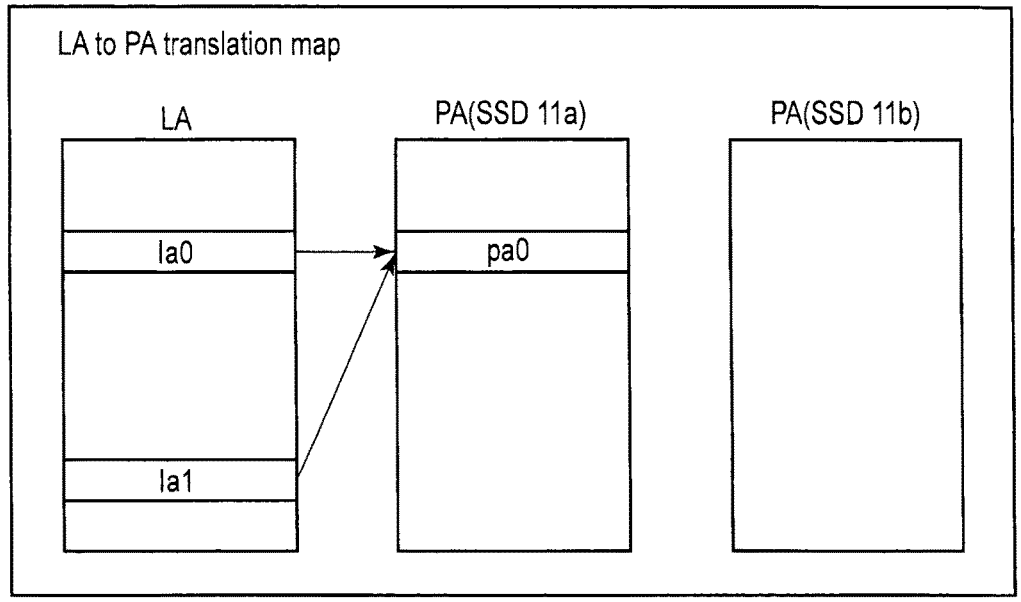
F I G. 34
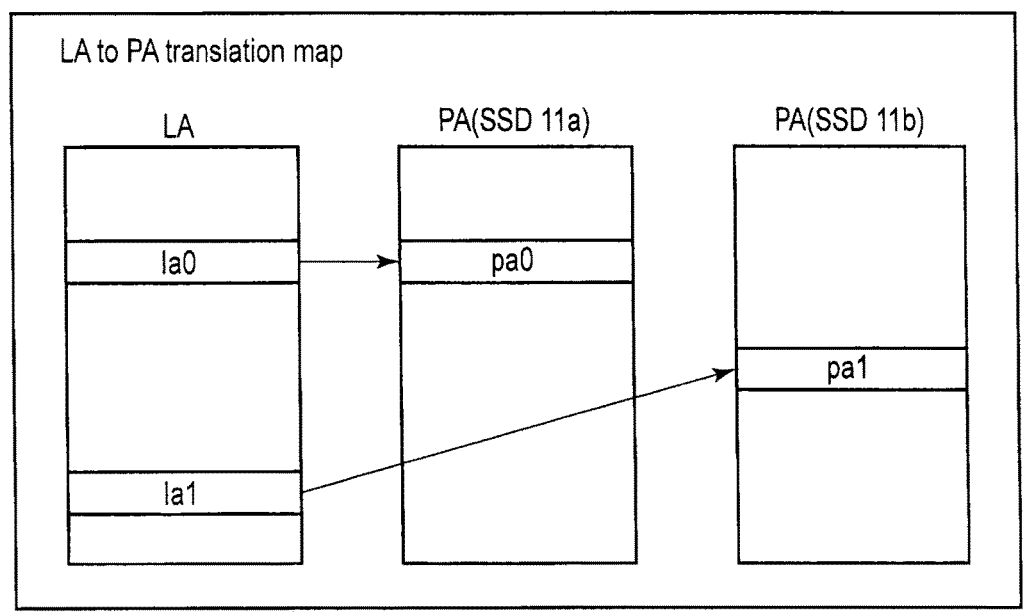
F I G. 35

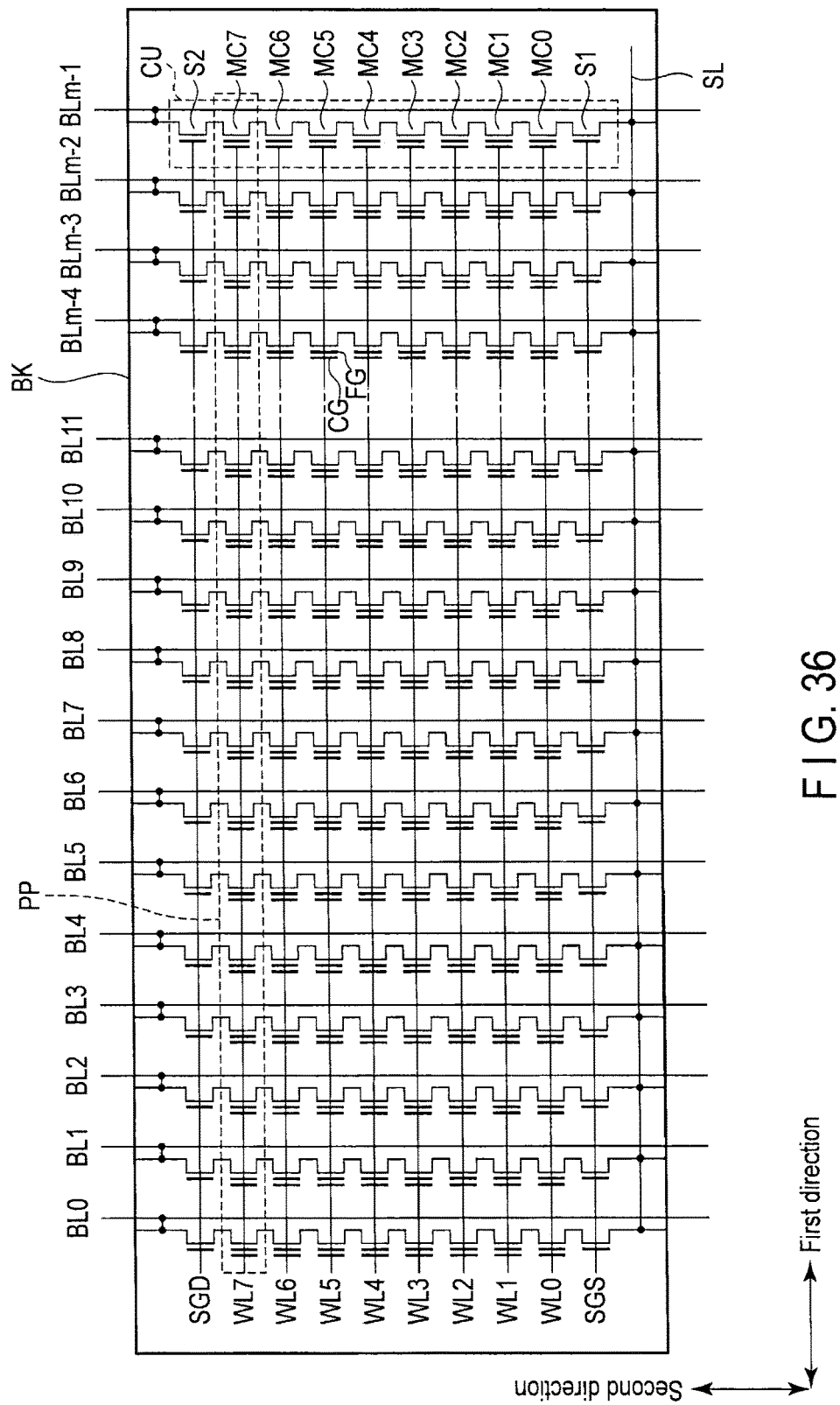
F I G. 36

STORAGE DEVICE AND MEMORY SYSTEM

CROSS-REFERENCE TO RELATED APPLICATIONS

This application claims the benefit of U.S. Provisional Application No. 62/130,923, filed Mar. 10, 2015, the entire contents of which are incorporated herein by reference.

FIELD

Embodiments described herein relate generally to a storage device and a memory system.

BACKGROUND

In a memory system comprising a storage device and a host, copying of data is executed by writing the data to the storage device by a write command after reading the data from the storage device by a read command. A method of ending the data copy early is desired as seen from the host.

BRIEF DESCRIPTION OF THE DRAWINGS

FIG. 1 to FIG. 3 are block diagrams showing an example of a memory system.

FIG. 4 is an illustration showing a LUT obtained after a copy operation, of a comparative example.

FIG. 5 is an illustration showing an address translation map obtained after the copy operation, of the comparative example.

FIG. 6A and FIG. 6B are flowcharts showing copy operations of a first embodiment.

FIG. 7 is an illustration showing a LUT obtained after the copy operation shown in FIG. 6A and FIG. 6B.

FIG. 8 is an illustration showing an address translation table obtained after the copy operation shown in FIG. 6A and FIG. 6B.

FIG. 13 is an illustration showing a LUT obtained after the overwrite operation shown in FIG. 12.

FIG. 14 is an illustration showing an address translation map obtained after the overwrite operation shown in FIG. 12.

FIG. 15A is an illustration showing an example of providing a pointer in a LUT.

FIG. 15B is an illustration showing an example of finding la1 paired with la0 by the pointer, at overwriting data at la0.

FIG. 15C is an illustration showing an example of finding la0 paired with la1 by the pointer, at overwriting data at la1.

FIG. 18A and FIG. 18B are flowcharts showing copy operations of a second embodiment.

FIG. 19 is an illustration showing a LUT obtained after the copy operation shown in FIG. 18A and FIG. 18B.

FIG. 20 is an illustration showing an address translation table of FIG. 19.

FIG. 22 is an illustration showing a LUT obtained after the overwrite operation shown in FIG. 21.

FIG. 23 is an illustration showing an address translation map of FIG. 22.

FIG. 24 is an illustration showing a LUT obtained after the overwrite operation shown in FIG. 21.

FIG. 25 is an illustration showing an address translation map of FIG. 24.

FIG. 28 and FIG. 29 are illustrations showing an example of an operation searching entries which share one physical address, in overwrite operations shown in FIGS. 21, 22, 23, 24 and 25.

FIG. 31 is an illustration showing an example of application to a portable computer.

FIG. 32 is a block diagram showing an example of application to a general storage device.

FIG. 33 is a block diagram showing an example of application to a unified storage device.

FIG. 34 and FIG. 35 are illustrations showing address translation maps in the device shown in FIG. 33.

FIG. 36 is an illustration showing an example of a NAND flash memory.

DETAILED DESCRIPTION

Figure 6B:
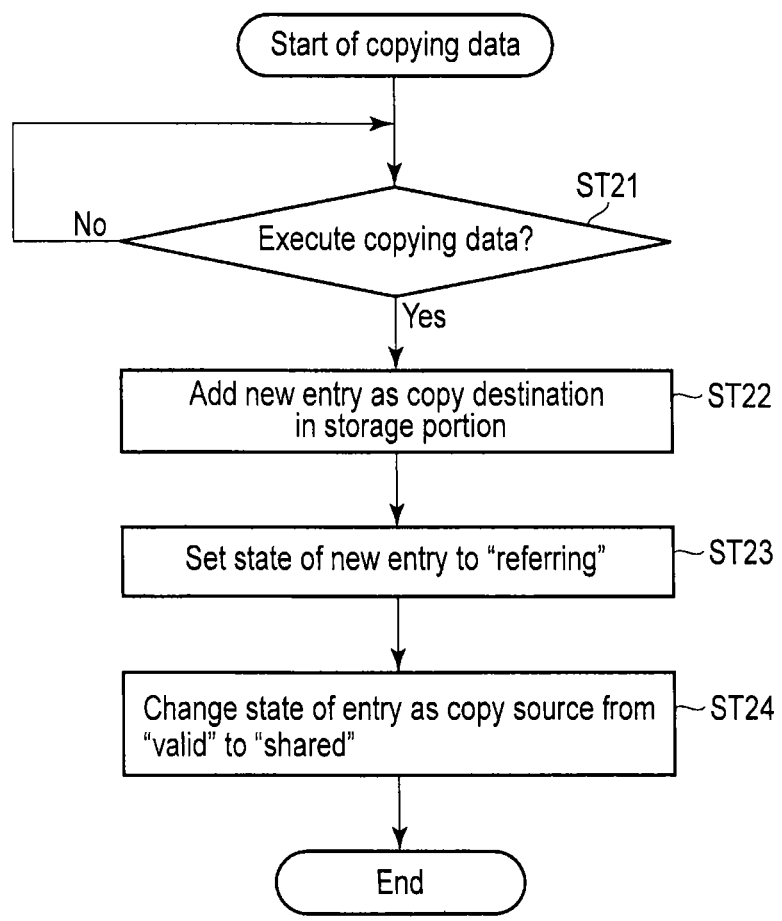

In general, according to one embodiment, a storage device comprises: a nonvolatile memory; a storage portion storing a first entry, the first entry comprising a first translation table corresponding between a first logical address and a first physical address on the nonvolatile memory, and a first state showing that data at the first physical address is a valid as data at the first logical address; and a controller adding a second entry in the storage portion and changing the first state to a second state when receiving a command from a host, the second entry comprising a second translation table corresponding between a second logical address and the first physical address, and a third state showing that the first physical address of the second translation table is referring to the first physical address of the first translation table, the second state showing that the first physical address of the first translation table is shared with the first physical address of the second translation table.

1. First Embodiment

FIG. 1 to FIG. 3 show an example of a memory system.

The memory system comprises a host 10 and a storage device 11. The host 10 controls reading/writing data from/in the storage device 11. The storage device 11 is a device capable of storing data in a nonvolatile manner. For example, the storage device 11 is a solid state drive (SSD), a storage server, etc.

The storage device 11 comprises a controller 12 and a nonvolatile memory 13. The controller 12 controls operations of the nonvolatile memory 13. The nonvolatile memory 13 is, for example, a NAND flash memory.

In an example of FIG. 1, the controller 12 comprises a processing portion 14a, a storage portion 14b, and a bus 15 which makes a connection between the portions. The controller 12 is included in, for example, a system on chip (SOC).

The processing portion 14a comprises, for example, a CMOS logic circuit and performs processing such as an operation. Storage portion 14b comprises, for example, a volatile memory such as a dynamic random access memory (DRAM) and a static random access memory (SRAM). Alternatively, storage portion 14b may be a temporary data storing circuit such as a register. Storage portion 14b comprises, for example, a look-up table (LUT).

In the embodiment, the LUT refers to a translation table of a logical address to a physical address or a translation map which associates the logical address with the physical address.

In the example of FIG. 2, a storage portion 14c is disposed outside the controller 12. In other words, the storage device 11 comprises the controller 12, the nonvolatile memory 13, and storage portion 14c. The controller 12 comprises, for example, a CMOS logic circuit and performs processing such as an operation. Storage portion 14c comprises, for example, a volatile memory such as a DRAM and an SRAM. Alternatively, storage portion 14c may be a temporary data storing circuit such as a register. Storage portion 14c comprises, for example, an LUT.

In an example of FIG. 3, the host 10 comprises a processing portion 14d and a storage portion 14e. The processing portion 14d comprises, for example, a CMOS logic circuit and performs processing such as an operation. Storage portion 14e comprises, for example, a volatile memory such as a DRAM and a SRAM. Alternatively, storage portion 14e may be a temporary data storing circuit such as a register. Storage portion 14e comprises, for example, an LUT.

Execution of data copy the data in this memory system will be considered here.

In general, the data copy is executed by writing the data from the host 10 in the storage device by a write command after reading the data from the storage device 11 to the host 10 by a read command.

An example of copying data at logical address la0 to logical address la1 when storage portions 14b, 14c and 14e store entry No. 0 as a translation table between logical address la0 and physical address pa0 as shown in, for example, FIG. 4, will be explained.

First, the host 10 in FIG. 1 to FIG. 3 issues a read command and reads the data at logical address la0. In other words, the host 10 reads the data from physical address pa0 of the nonvolatile memory shown in FIG. 1 to FIG. 3 which corresponds to logical address la0.

After that, the host 10 in FIG. 1 to FIG. 3 issues a write command and copies the data at logical address la0 to logical address la1. In other words, the host 10 writes the data at logical address la0 to physical address pa1 of the nonvolatile memory shown in FIG. 1 to FIG. 3 which corresponds to logical address la1.

Then, new entry No. 1 is added to storage portions 14b, 14c and 14e. Entry No. 1 stores a translation table between logical address la1 and physical address pa1.

In entries No. 1 and No. 2, "valid" indicates that the data stored at physical addresses pa0 and pa1 is valid as the data at logical addresses la0 and la1. In other words, the data stored at physical addresses pa0 and pa1 is the valid data. The valid data is the data associated with the logical address. In contrast, invalid data is the data unassociated with the logical address.

In this case, the translation map which associates the logical address LA and the physical address PA with each other becomes a translation map shown in FIG. 5 after the data copy. In other words, the data at a copy source (i.e., data at logical address la0) and the data at a copy destination (i.e., data at logical address la1) are actually written to physical addresses pa0 and pa1, respectively, by the copy operations.

Until a processing sequence is completed, however, other processing of the host 10 is limited. In addition, if the data at the copy source or the data at the copy destination is overwritten immediately after the data copy, writing the data in the nonvolatile memory concerning the copy operation is useless. As a result, the number of reads/writes from/to the nonvolatile memory becomes greater and weariness on the nonvolatile memory increases.

Thus, a new algorithm for completing the copy operation by merely changing the tables in storage portions 14b, 14c and 14e without writing to the physical address of the nonvolatile memory 13, in the above-explained copy operation, will be proposed below.

FIG. 6A and FIG. 6B show the copy operation of the first embodiment.

An example of copying data at logical address la0 to logical address la1 when storage portions 14b, 14c and 14e shown in FIG. 1 to FIG. 3 store entry No. 0 as the translation table between logical address la0 and physical address pa0 as shown in FIG. 7 will be explained here. In other words, the data at logical address la0 is data at the copy source.

First, it is confirmed whether the data at logical address la0 is copied or not.

In the memory system shown in FIG. 1 and FIG. 2, storage portions (for example, an LUT) 14b and 14c are disposed in the storage device 11. For this reason, when the data copy is executed, the host 10 issues a copy command and transfers the copy command to the storage device 11. The storage device 11 receives the copy command transferred from the host 10 (step ST11).

The copy command is a newly added command. Unlike commands which produce operations of the nonvolatile memory 13 such as the read command and the write command, the copy command does not produce the operations of the nonvolatile memory 13.

The copy command indicates a command which ends the data copy by merely changing the tables in storage portions 14b and 14c as explained below.

When the controller 12 or the processing portion 14a in the storage device 11 receives the copy command, the controller 12 or the processing portion 14a executes processing of changing the tables in storage portions 14b and 14c.

In addition, in the memory system shown in FIG. 3, storage portion (for example, an LUT) 14e is disposed in the host 10. For this reason, when the data copy is executed, storage portion 14d in the host 10 can end the data copy by merely changing the table in storage portion 14e, without issuing the copy command.

When storage portion 14d in the host 10 executes the data copy, the processing portion 14d executes processing of changing the table in storage portion 14e.

The processing of changing the tables in storage portions 14b, 14c and 14e will be hereinafter explained.

A subject of the processing is the processing portion 14d in the host 10, the controller 12 in the storage device 11, or the processing portion 14a in the controller 12.

First, a new entry is added to storage portions 14b, 14c and 14e as a copy destination (steps ST12 and ST22).

New entry No. 1 stores a translation table between logical address la1 and physical address pa0 as shown in, for example, FIG. 7.

The important point is that physical address la0 of entry No. 0 which is the copy source is the same as physical address la1 of entry No. 1 which is the copy destination. In other words, the read/write operation required for the copy operation in FIG. 4 is made unnecessary by associating two logical addresses la0 and la1 with the same physical address pa0.

However, if two logical addresses la0 and la1 remain associated with the same physical address pa0, for example, when the data at the copy source (logical address la0) or the copy destination (logical address la1) is overwritten, the data which is not overwritten is erased.

Therefore, for example, the state of entry No. 0 which is the copy source is changed from "valid" to "shared" and the state of entry No. 1 which is the copy destination is set to be "referring" during a period from a time when the data is copied to a time when the data at the copy source or the copy destination is overwritten (steps ST13 to ST14 and steps ST23 to ST24).

"shared" indicates that physical address pa0 of entry No. 0 which is the copy source is shared by physical address pa0 of entry No. 1 which is the copy destination. In addition, "referring" indicates that physical address pa0 of entry No. 1 which is the copy destination refers to physical address pa0 of entry No. 0 which is the copy source.

The state of entry No. 0 is changed from "valid" to "shared" in FIG. 7, but the data stored at physical address pa0 is associated with logical address la0 and remains the valid data.

Thus, even if the processing of overwriting the data at the copy source or the copy destination occurs after the data copy, the data at the copy source or the copy destination is not erased by confirming the state of each entry and executing predetermined processing which will be hereinafter explained.

The translation map which associates the logical address LA and the physical address PA with each other becomes a translation map shown in FIG. 8 after ending the above-explained data copy operation. In other words, logical address la0 of the copy source and logical address la1 of the copy destination are associated with the same physical address pa0. Thus, weariness of the nonvolatile memory can be avoided by associating two logical addresses la0 and la1 with the same physical address pa0.

Next, an example of overwriting the data at logical address la0 which is the copy source, an example of overwriting the data at logical address la1 which is the copy destination, and an example of shifting to a power save mode, after executing the copy operations, will be explained.

Figure 9:
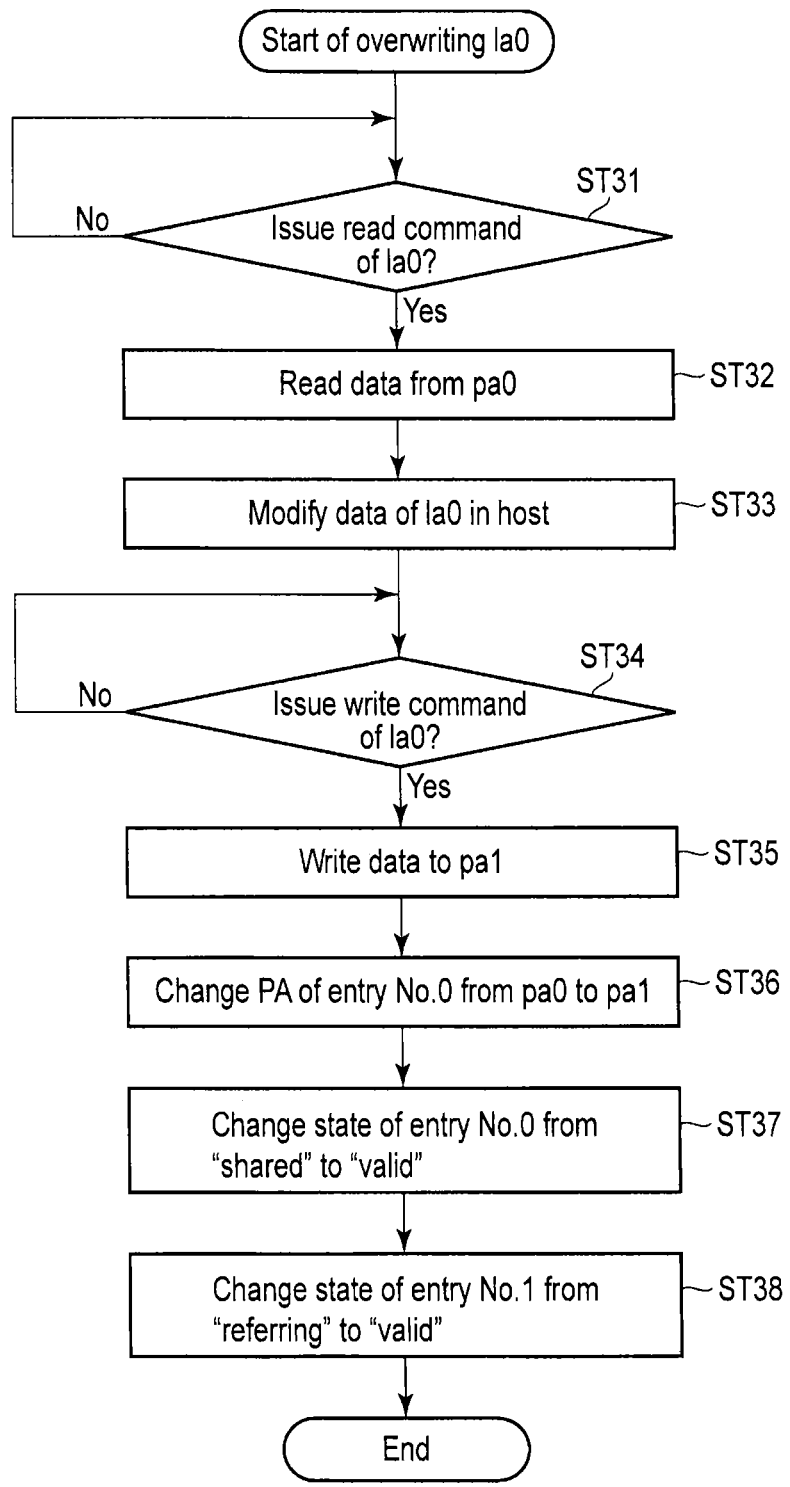
FIG. 9 is a flowchart showing a first example of an overwrite operation executed after the copy operation, of the first embodiment.

FIG. 9 shows an algorithm of the memory system of overwriting the data at logical address la0 after the copy operation shown in FIG. 6A or FIG. 6B.

First, it is confirmed whether a read command of logical address la0 has been issued or not (step ST31).

If the read command of logical address la0 has been issued, the data at logical address la0 is read. In other words, the data is read from physical address pa0 corresponding to logical address la0 (step ST32).

After that, the data at logical address la0 is modified in the host. In other words, the data read from physical address pa0 is modified in the host to become overwrite data (step ST33).

Next, it is confirmed whether a write command of logical address la0 has been issued or not (step ST34).

If the write command of the overwrite data at logical address la0 has been issued, the overwrite data is written to physical address pa1 (step ST35).

At this time, the physical address PA of entry No. 0 is changed from pa0 to pa1, the state of entry No. 0 is changed from "shared" to "valid", and the state of entry No. 1 is changed from "referring" to "valid" (steps ST36 to ST38).

Figures 10, 11:
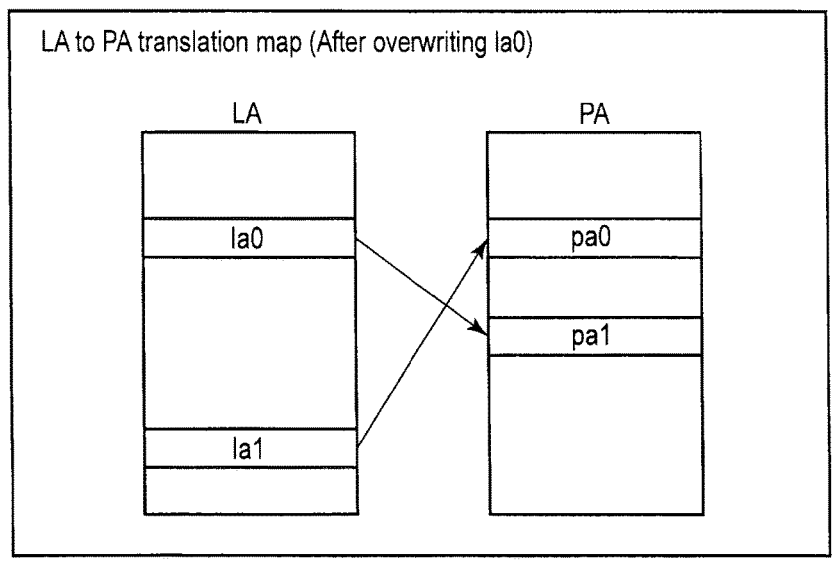
FIG. 10 is an illustration showing a LUT obtained after the overwrite operation shown in FIG. 9.
FIG. 11 is an illustration showing an address translation map obtained after the overwrite operation shown in FIG. 9.

As a result, entry No. 0 includes a translation table of logical address la0 and physical address pa1 and the state "valid" indicating that the data stored at physical address pa1 is valid as the data at logical address la0, as shown in, for example, FIG. 10.

In addition, entry No. 1 includes a translation table of logical address la1 and physical address pa0 and the state "valid" indicating that the data stored at physical address pa0 is valid as the data at logical address la1.

The translation map which associates the logical address LA and the physical address PA with each other becomes a translation map shown in FIG. 11 after ending the above-explained overwrite operation. In other words, logical address la0 is associated with physical address pa1 while logical address la1 is associated with physical address pa0.

Since each of two logical addresses la0 and la1 is thus associated with two physical addresses pa1 and pa0, when the data at either of two logical addresses la0 and la1 is overwritten the other data is not erased.

It should be noted that entry No. 0 including logical address la0 can easily be found at the time of overwriting the data at logical address la0. Thus, the physical address PA and the state of entry No. 0 can be changed immediately as shown in, for example, FIG. 10.

However, entry No. 1 paired with entry No. 0 cannot be found unless the physical addresses, states, etc., in the storage portion (LUT) are searched. In other words, it is estimated that much time is required to find entry No. 1 paired with entry No. 0 at the time of overwriting the data at logical address la0.

Thus, when the data at logical address la0 is overwritten, each entry may include a pointer to make entry No. 1 paired with entry No. 0 easily found, as shown in, for example, FIG. 15A and FIG. 15B.

In the examples shown in FIG. 15A and FIG. 15B, for example, entry No. 0 includes a pointer indicating entry No. 1, and entry No. 1 includes a pointer indicating entry No. 0.

In this case, when entry No. 0 is seen to overwrite the data at logical address la0, the pointer of entry No. 0 indicates No. 1. It can easily be therefore understood that entries No. 0 and No. 1 are paired and that when the data at logical address la0 is overwritten, the state of entry No. 0 may be changed from "shared" to "valid" and the state of entry No. 1 may be changed from "referring" to "valid".

Figure 12:
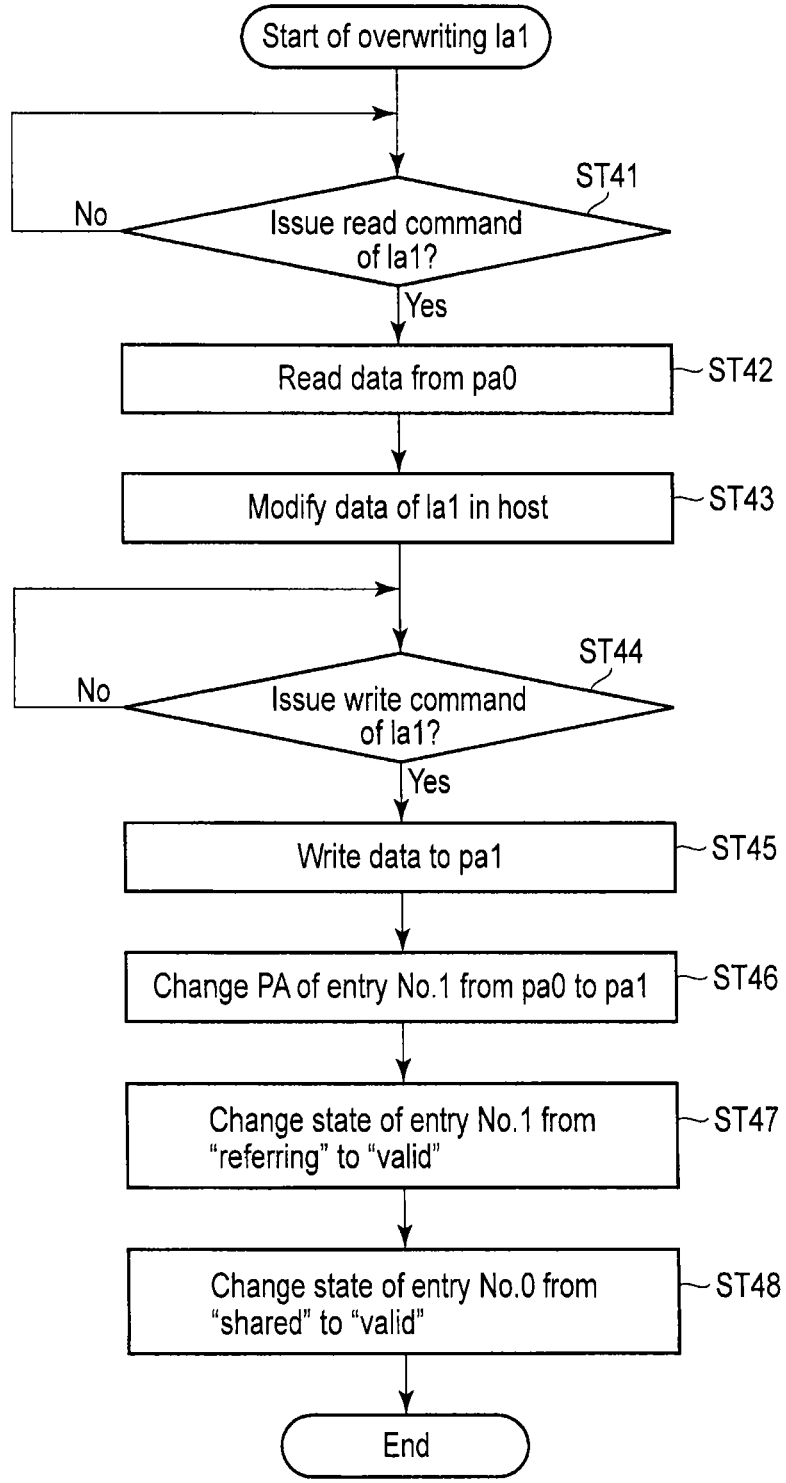
FIG. 12 is a flowchart showing a second example of the overwrite operation executed after the copy operation, of the first embodiment.

FIG. 12 shows an algorithm of the memory system of overwriting the data at logical address la1 after the copy operation shown in FIG. 6A or FIG. 6B.

First, it is confirmed whether a read command of logical address la1 has been issued or not (step ST41).

If the read command of logical address la1 has been issued, the data at logical address la1 is read.

In other words, the data is read from physical address pa0 corresponding to logical address la1 (step ST42).

After that, the data at logical address la1 is modified in the host. In other words, the data read from physical address pa0 is modified in the host to become overwrite data (step ST43).

Next, it is confirmed whether a write command of logical address la1 has been issued or not (step ST44).

If the write command of the overwrite data at logical address la1 has been issued, the overwrite data is written to physical address pa1 (step ST45).

At this time, the physical address PA of entry No. 1 is changed from pa0 to pa1, the state of entry No. 1 is changed from "referring" to "valid", and the state of entry No. 0 is changed from "shared" to "valid" (steps ST46 to ST48).

As a result, entry No. 0 includes a translation table of logical address la0 and physical address pa1 and the state "valid" indicating that the data stored at physical address pa0 is valid as the data at logical address la0, as shown in, for example, FIG. 13.

In addition, entry No. 1 includes a translation table of logical address la1 and physical address pa1 and the state "valid" indicating that the data stored at physical address pa1 is valid as the data at logical address la1.

The translation map which associates the logical address LA and the physical address PA with each other becomes a translation map shown in FIG. 14 after ending the above-explained overwrite operation. In other words, logical address la0 is associated with physical address pa0 while logical address la1 is associated with physical address pa1.

Since each of two logical addresses la0 and la1 is thus associated with two physical addresses pa1 and pa0, when the data at either of two logical addresses la0 and la1 is overwritten the other data is not erased.

Thus, when the data at logical address la0 is overwritten, each entry may include a pointer to allow entry No. 1 paired with entry No. 0 to be easily found, as shown in, for example, FIG. 15A and FIG. 15C.

In the examples of FIG. 15A and FIG. 15C, for example, when entry No. 1 is seen to overwrite the data at logical address la1, the pointer of entry No. 1 indicates No. 0. It can easily be therefore understood that entries No. 0 and No. 1 are paired and that when the data at logical address la1 is overwritten, the state of entry No. 1 may be changed from "referring" to "valid" and the state of entry No. 0 may be changed from "shared" to "valid".

In addition, when an operation in a power save mode of cutting off the power supplies of storage portions 14b, 14c and 14e shown in, for example, FIG. 1 to FIG. 3 for lower power consumption of the memory system, the LUT stored in storage portions 14b, 14c and 14e may be backed up to a nonvolatile memory before cutting off the power supplies.

In other words, it is desirable that in the power save mode, for example, the operation of backing up the LUT to the nonvolatile memory alone should be executed and an actual write operation of changing the state of each entry in the LUT (from "shared" to "valid" or from "referring" to "valid") should not be executed.

The first embodiment can be thereby applied to the memory system of executing the operation in the power save mode.

According to the first embodiment, as described above, the data copy is completed without executing the read/write operation in the data storage device. In other words, the data copy is completed by merely changing the LUT in the data storage device or the LUT in the host.

Then, actual writing to the data storage device is executed at a predetermined time, for example, when the data at the copy source or the copy destination is overwritten.

The data copy is thereby completed early as seen from the host. Therefore, the host can execute the other processing as the time for data copy is shortened. In addition, since unnecessary writing to the nonvolatile memory can be prevented, the endurance performance of the nonvolatile memory can be increased.

2. Second Embodiment

FIG. 16 to FIG. 19 show LUT in a memory system of a second embodiment.

LUT in the memory system of the second embodiment includes a next pointer besides a logical address and a physical address, for each entry. The next pointer comprises the function of the state in FIG. 6A to FIG. 14 and the function of the pointer shown in FIG. 15A, FIG. 15B and FIG. 15C.

Figures 16, 17:
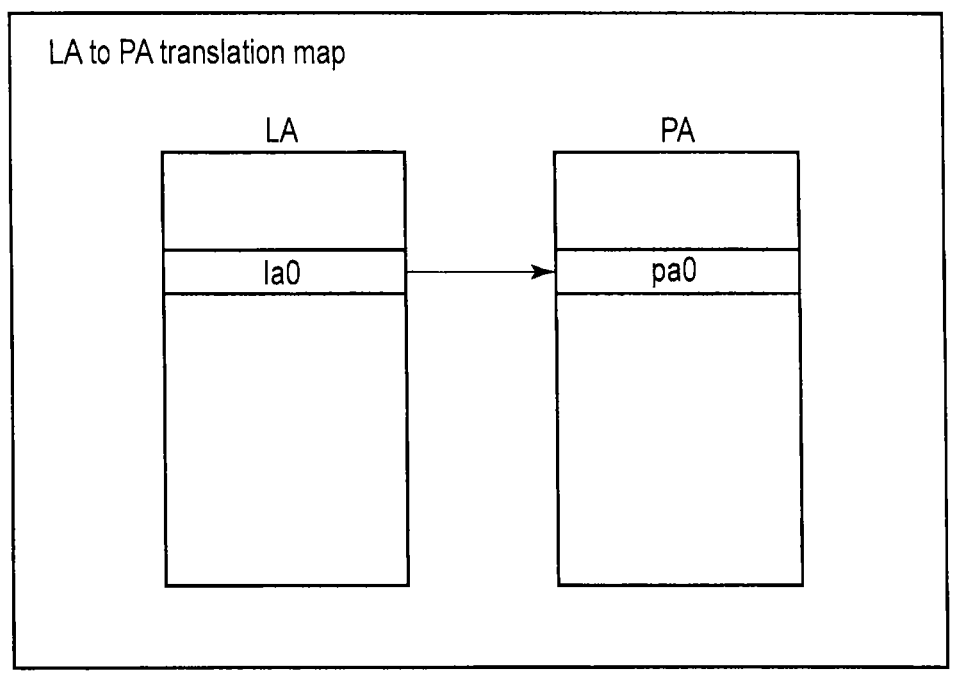
FIG. 16 is an illustration showing an example of providing a next pointer in a LUT.
FIG. 17 is an illustration showing an address translation map of FIG. 16.

For example, when logical address la0 of entry No. 0 is associated with physical address pa0 as shown in FIG. 16 and when the logical address la0 and the physical address pa0 are in a one-to-one correspondence, i.e., when the physical address pa0 is associated with the logical address la0 alone, as shown in FIG. 17, the next pointer of the entry No. 0 stores its own entry number, i.e., 0.

When the next pointer stores the own entry number, data of the physical address associated with the logical address of the entry is valid data.

In addition, when logical addresses la0 and la1 at respective entries No. 0 and No. 1 are associated with physical address pa0, i.e., when one physical address pa0 is associated with a plurality of logical addresses la0 and la1, as shown in FIG. 19, the next pointer stores data indicating that the logical addresses la0 and la1 at respective entries No. 0 and No. 1 share one physical address pa0.

For example, the next pointer at each of a plurality of entries (target entries) No. 0 and No. 1 sharing one physical address pa0 stores the number of a target entry present right after the own entry, i.e., the number of a target entry (next target entry) subsequent to the own entry. The term "next" of the next pointer implies storing the number of the next target entry. However, when the target entry is not present right after the own entry, the next pointer of the entry stores the number of a top target entry of the target entries.

In other words, in the example of FIG. 19, the next pointer of entry No. 0 stores the number of entry No. 1 which is present right after entry No. 0, i.e., 1 while the next pointer of entry No. 1 stores the number of entry No. 0 which is the top target entry, i.e., 0 since the target entry is not present just after entry No. 1.

When the next pointers of entry No. 0 and entry No. 1 store the numbers of target entries, respectively, data of each of the physical addresses associated with the logical addresses of entry No. 0 and entry No. 1 is valid data.

FIG. 18A and FIG. 18B show the copy operation of the second embodiment.

An example of copying data at logical address la0 to logical address la1 when the storage portions 14b, 14c and 14e shown in FIG. 1 to FIG. 3 store entry No. 0 as the translation table between logical address la0 and physical address pa0 as shown in FIG. 19 will be explained. In other words, the data at logical address la0 is to be data at the copy source.

FIG. 18A and FIG. 18B correspond to FIG. 6A and FIG. 6B, respectively. The same steps as those shown in FIG. 6A and FIG. 6B are not explained in detail below.

First, it is confirmed whether the data at logical address la0 is copied or not.

In the memory system shown in FIG. 1 and FIG. 2, when the data copy is executed, the host 10 issues a copy command and transfers the copy command to the storage device 11. The storage device 11 receives the copy command transferred from the host 10 (step ST51).

When the controller 12 or the processing portion 14a in the storage device 11 receives the copy command, the controller 12 or the processing portion 14a executes processing of changing the tables in storage portions 14b and 14c.

In addition, in the memory system shown in FIG. 3, when the data copy is executed, processing portion 14d in the host 10 can end the data copy by merely changing the table in storage portion 14e, without issuing the copy command (step ST61).

When the processing portion 14d in the host 10 executes the data copy, the processing portion 14d executes processing of changing the table in storage portion 14e.

The processing of changing the tables in the storage portions 14b, 14c and 14e will be hereinafter explained.

First, a new entry is added to the storage portions 14b, 14c and 14e as a copy destination (steps ST52 and ST62).

As shown in, for example, FIG. 19, new entry No. 1 stores a translation table between logical address la1 and physical address pa0.

Two logical addresses la0 and la1 are associated with the same physical address pa0 in the present embodiment, too, similarly to the embodiment shown in FIG. 6A and FIG. 6B and, for example, when the data at the copy source (logical address la0) or the copy destination (logical address la1) is overwritten, an idea of preventing the data which is not overwritten from being erased is required.

Therefore, in the present embodiment, the next pointer of entry No. 0 which is the copy source is changed from own entry number 0 to entry number 1 of entry No. 1 which is the next target entry, during a period from a time when the data is copied to a time when the data at the copy source or the copy destination is overwritten. In addition, the next pointer of entry No. 1 which is the copy destination is set at entry number 0 of entry No. 0 which is the top target entry (steps ST53 and ST63).

When the next pointer thus stores not the own entry number, but the entry number of the other entry, the entry having the next pointer is what is called a target entry which shares a physical address at a plurality of logical addresses.

Thus, even if the processing of overwriting the data at the copy source or the copy destination occurs after the data copy, the data at the copy source or the copy destination is not erased by confirming the next pointer of each entry and executing predetermined processing which will be hereinafter explained.

The translation map which associates the logical address LA and the physical address PA with each other becomes a translation map shown in FIG. 20 after ending the above-explained data copy operation. In other words, logical address la0 of the copy source and logical address la1 of the copy destination are associated with the same physical address pa0. Thus, weariness of the nonvolatile memory can be avoided by associating two logical addresses la0 and la1 with the same physical address pa0.

Next, an example of overwriting the data at logical address la0 which is the copy source, and an example of overwriting the data at logical address la1 which is the copy destination, after executing the copy operations, will be explained.

Figure 21:
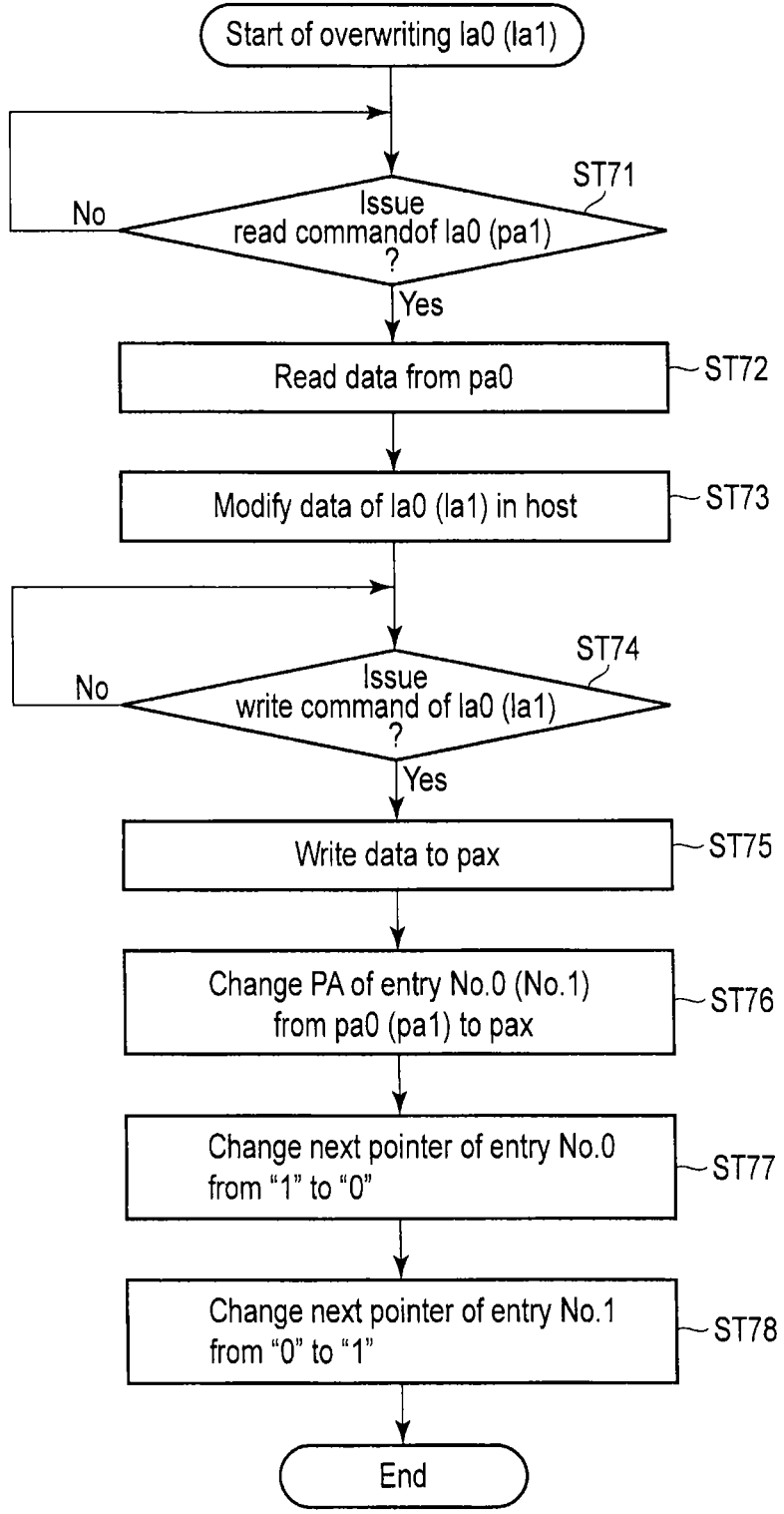
FIG. 21 is a flowchart showing an example of an overwrite operation executed after the copy operation, of the second embodiment.

FIG. 21 shows an algorithm of the memory system of overwriting the data at logical address la0 (la1) after the copy operation shown in FIG. 18A or FIG. 18B.

First, it is confirmed whether a read command of logical address la0 (la1) has been issued or not (step ST71).

If the read command of logical address la0 (la1) has been issued, the data at logical address la0 (la1) is read. In other words, the data is read from physical address pa0 corresponding to logical address la0 (la1) (step ST72).

After that, the data at logical address la0 (la1) is modified in the host. In other words, the data read from physical address pa0 is modified in the host to become overwrite data (step ST73).

Next, it is confirmed whether a write command of logical address la0 (la1) has been issued or not (step ST74).

If the write command of the overwrite data at logical address la0 (la1) has been issued, the overwrite data is written to physical address pax (step ST75).

When the data at logical address la0 is overwritten, the physical address PA of entry No. 0 is changed from pa0 to pax, the next pointer of entry No. 0 is changed from the entry number 1 of entry No. 1 which is the next target entry to the own entry number 0, and the next pointer of entry No. 1 is changed from the entry number 0 of entry No. 0 which is the top target entry to the own entry number 1 (steps ST76 to ST78).

Consequently, as shown in, for example, FIG. 22, entry No. 0 includes a translation table between logical address la0 and physical address pax, and a next pointer which stores the own entry number 0. In addition, entry No. 1 includes a translation table between logical address la1 and physical address pa0, and a next pointer which stores the own entry number 1.

The translation map which associates the logical address LA and the physical address PA with each other becomes a translation map shown in FIG. 23 after ending the above-explained overwrite operation.

When the data at logical address la1 is overwritten, the physical address PA of entry No. 1 is changed from pa0 to pax, the next pointer of entry No. 1 is changed from the entry number 0 of entry No. 0 which is the top target entry to the own entry number 1, and the next pointer of entry No. 0 is changed from the entry number 1 of entry No. 1 which is the next target entry to the own entry number 0 (steps ST76 to ST78).

Consequently, as shown in, for example, FIG. 24, entry No. 0 includes a translation table between logical address la0 and physical address pa0, and a next pointer which stores the own entry number 0. In addition, entry No. 1 includes a translation table between logical address la1 and physical address pax, and a next pointer which stores the own entry number 1.

The translation map which associates the logical address LA and the physical address PA with each other becomes a translation map shown in FIG. 25 after ending the above-explained overwrite operation.

Since two logical addresses la0 and la1 are thus associated with two physical addresses pa1 and pa0, respectively, when the data at either of two logical addresses la0 and la1 is overwritten, the other data is not erased.

Figure 26:
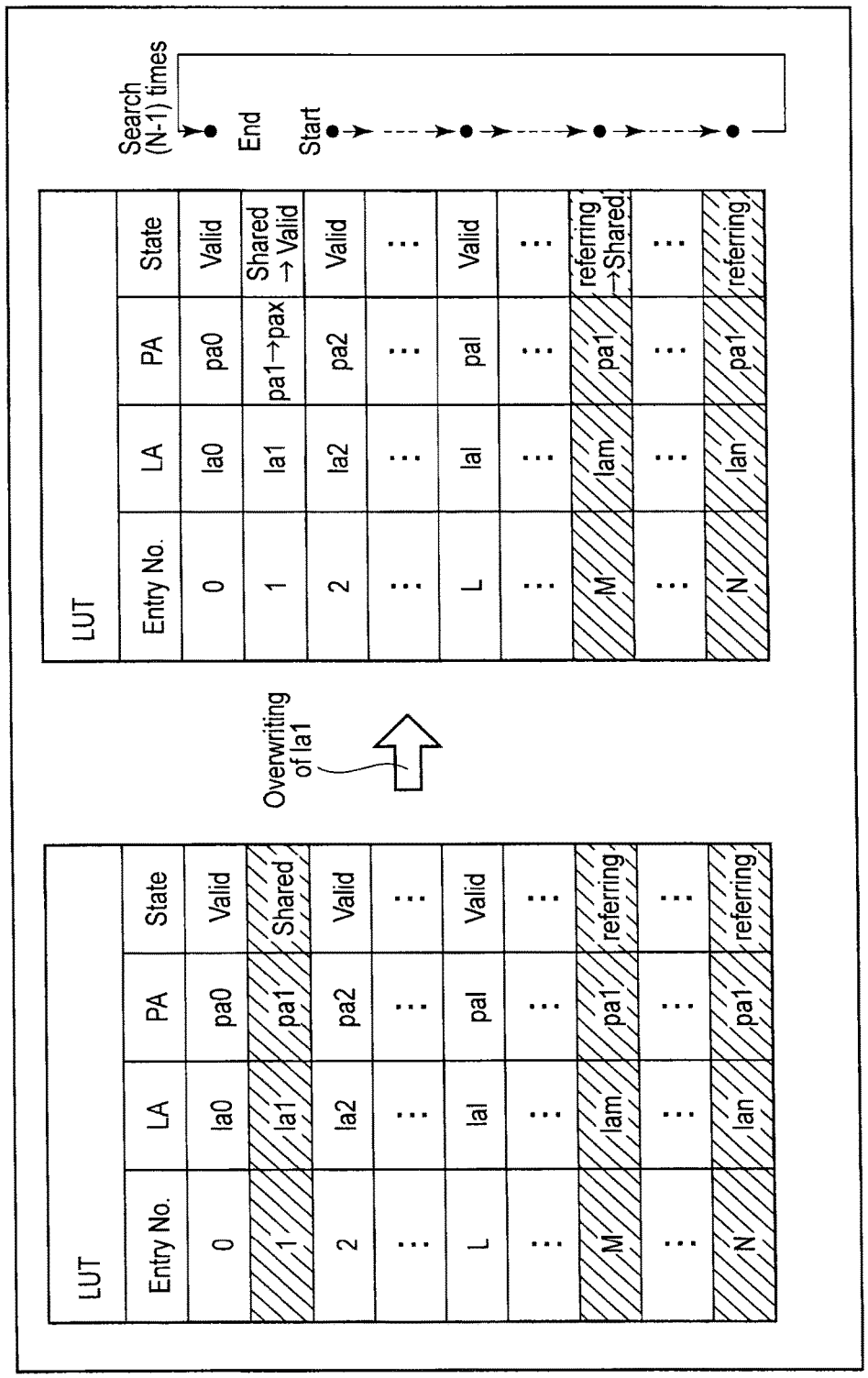
FIG. 26 is an illustration showing an example of an operation searching entries which share one physical address, in overwrite operations shown in FIGS. 9, 10, 11, 12, 13 and 14.

FIG. 26 shows an example of an operation of searching for entries sharing a physical address, in the overwrite operation shown in FIG. 9 to FIG. 14.

In this example, a state is set in a lookup table (LUT) to search for entries sharing a physical address at overwriting the data. In other words, when the logical address of the entry at which the state indicates shared, all of entries at which the state indicates referring are searched and the states of these entries are changed.

It is assumed that the data at logical address la1 of entry No. 1 is overwritten when the state of entry No. 1 indicates shared and the states of entry No. M and entry No. N indicate referring as shown in, for example, FIG. 26.

In this case, a physical address associated with logical address la1 of entry No. 1 is represented by pax, and the state of entry No. 1 is changed from shared to valid. At this time, entries in which the states indicate referring are searched, and the states of the entries are changed.

This search is executed for all entries other than entry No. 1 which is to be overwritten. In other words, this search is executed for entry No. 2 subsequent to entry No. 1 which is to be overwritten to last entry No. N and first entry No. 0, at totally N-1 times.

After the search, for example, the state of entry No. M is changed to shared.

Figure 27:
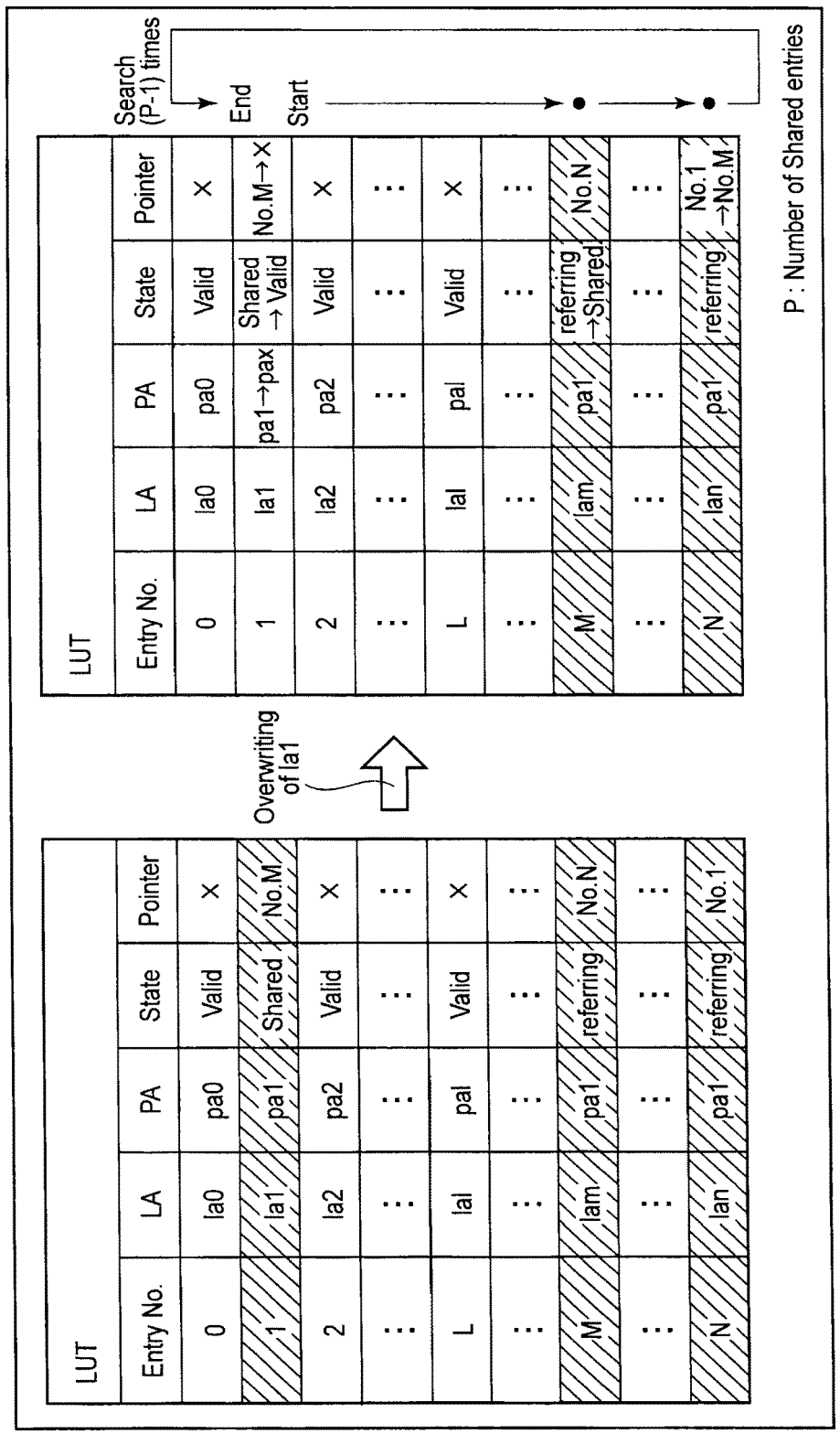
FIG. 27 is an illustration showing an example of an operation searching entries which share one physical address, in overwrite operations shown in FIGS. 15A, 15B and 15C.

FIG. 27 shows an example of an operation of searching for entries sharing a physical address, in the overwrite operation shown in FIG. 15A, FIG. 15B, and FIG. 15C.

In the example of providing a pointer in the LUT, the time to search for entries sharing a physical address can be reduced at overwriting the data.

It is assumed that the data at logical address la1 of entry No. 1 is overwritten when the state of entry No. 1 indicates shared and the states of entry No. M and entry No. N indicate referring as shown in, for example, FIG. 27.

In this case, a physical address associated with logical address la1 of entry No. 1 is represented by pax, and the state of entry No. 1 is changed from shared to valid. At this time, entries in which the states indicate referring are searched, and the states of the entries are changed.

This search is executed by referring to the pointers. In other words, the pointer of entry No. 1 which is to be overwritten indicates entry No. M. The pointer of entry No. M indicates entry No. 1. This search may be therefore executed for entry No. M and entry No. N.

In general, when the number of logical addresses sharing a physical address, i.e., the number of shared entries is represented by P, the search may be executed at P-1 times.

After the search, for example, the state of entry No. M is changed to shared and the pointer of entry No. N is changed from No. 1 to No. M.

Figure 29:
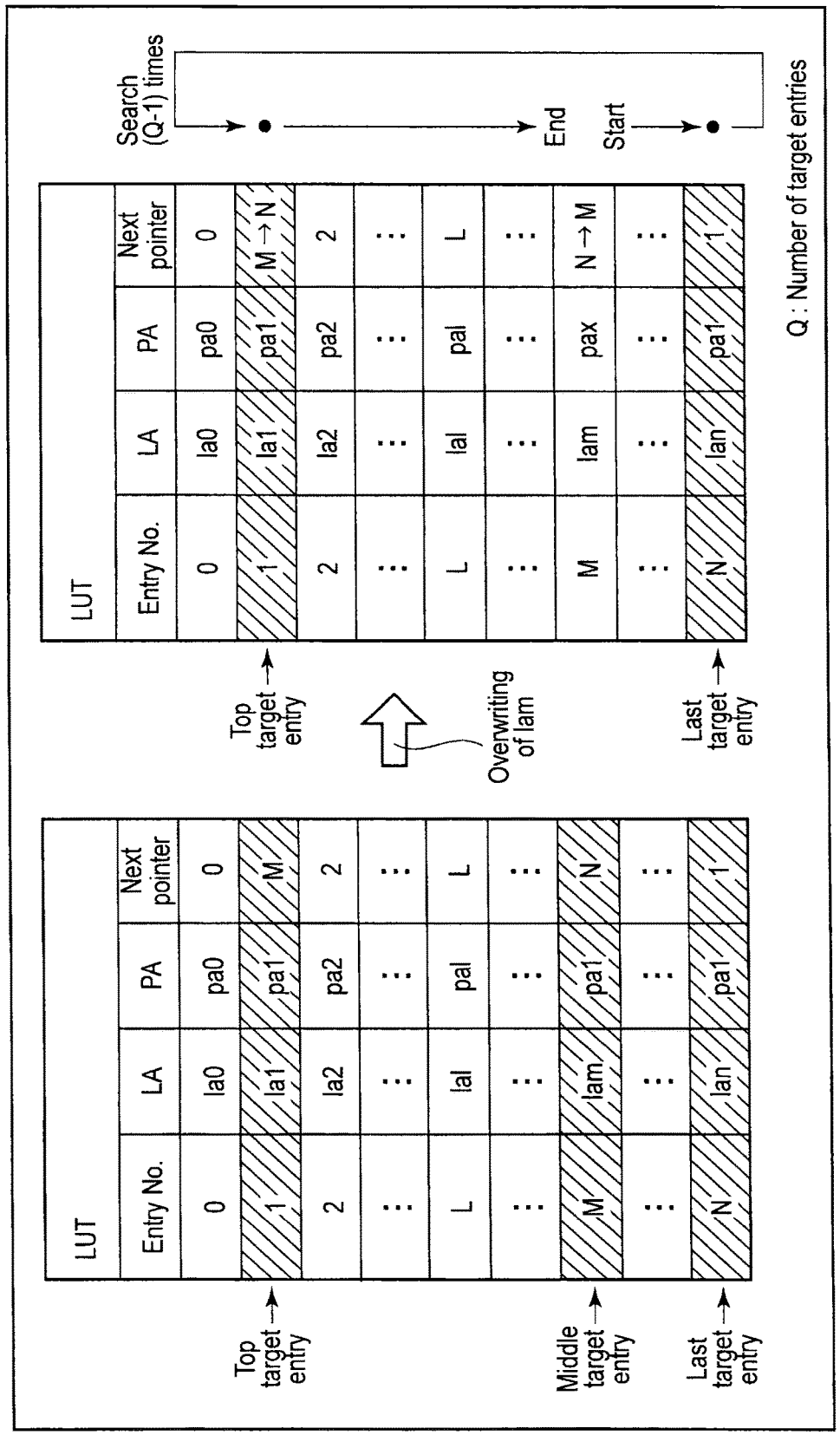

FIG. 28 and FIG. 29 show an example of an operation of searching for entries sharing a physical address, in the overwrite operation shown in FIG. 21 to FIG. 25.

In the example of providing a next pointer in the LUT, the time to search for entries sharing a physical address can be reduced without complicating a control circuit or control method for searching, at overwriting the data.

It is assumed that the data at logical address la1 of entry No. 1 is overwritten when logical addresses la1, lam and lan of target entries, i.e., entry No. 1, entry No. M and entry No. N share physical address pa1 as shown in, for example, FIG. 28.

In this case, the next pointer of entry No. 1 which is the top target entry stores entry number M of entry (middle target entry) No. M which is the next target entry, the next pointer of entry No. M which is the middle target entry stores entry number N of entry (last target entry) No. N which is the next target entry, and the next pointer of entry No. N which is the last target entry stores entry number 1 of entry No. 1 which is the top target entry, before the overwrite.

After the overwrite, the physical address associated with logical address la1 of entry No. 1 is represented by pax, and the next pointer of entry No. 1 is changed from entry number M of entry No. M which is the next target entry to the own entry number 1. At this time, the target entries other than entry No. 1 are searched, and the next pointers of the target entries are changed as needed.

This search is executed by referring to the next pointers. In other words, the next pointer of entry No. 1 which is to be overwritten indicates entry No. M, before the overwrite. In addition, the next pointer of entry No. M indicates entry No. N, before the overwrite. Furthermore, the next pointer of entry No. N indicates entry No. 1, before the overwrite.

This search may be therefore executed for entry No. M and entry No. N.

In general, when the number of logical addresses sharing a physical address, i.e., the number of target entries is represented by Q, the search may be executed at Q-1 times.

After the search, for example, the target entry just before entry No. 1 which is to be overwritten (if not present, last target entry), i.e., the next pointer of entry No. N in the present example, is changed from entry number 1 of entry No. 1 to the target entry just after entry No. 1 which is to be overwritten, i.e., entry number M of entry No. M in the present example.

It is assumed that the data at logical address lam of entry No. M is overwritten when logical addresses la1, lam and lan of entries (target entries), i.e., entry No. 1, entry No. M and entry No. N share physical address pa1 as shown in, for example, FIG. 29.

In this case, after the overwrite, the physical address associated with logical address lam of entry No. M is represented by pax, and the next pointer of entry No. M is changed from entry number N of entry No. N which is the next target entry to the own entry number M. At this time, the target entries other than entry No. M are searched, and the next pointers of the target entries are changed as needed.

This search is executed by referring to the next pointers, similarly to the search (FIG. 28) executed at overwriting the data at logical address la1 of entry No. 1. In other words, the next pointer of entry No. M which is to be overwritten indicates entry No. N, before the overwrite. In addition, the next pointer of entry No. N indicates entry No. 1 before the overwrite. Furthermore, the next pointer of entry No. 1 indicates entry No. M before the overwrite.

This search may be therefore executed for entry No. N and entry No. 1.

After the search, for example, the target entry just before entry No. M which is to be overwritten, i.e., the next pointer of entry No. 1 in the present example, is changed from entry number M of entry No. M to the target entry just after entry No. M which is to be overwritten, i.e., entry number N of entry No. N in the present example.

Thus, in the present example, even if the data at the logical address of any entry of Q target entries is overwritten, the search is executed at Q-1 times, and two next pointers of the entry at which the data is to be overwritten and an entry right before the entry may be changed.

Figure 30:
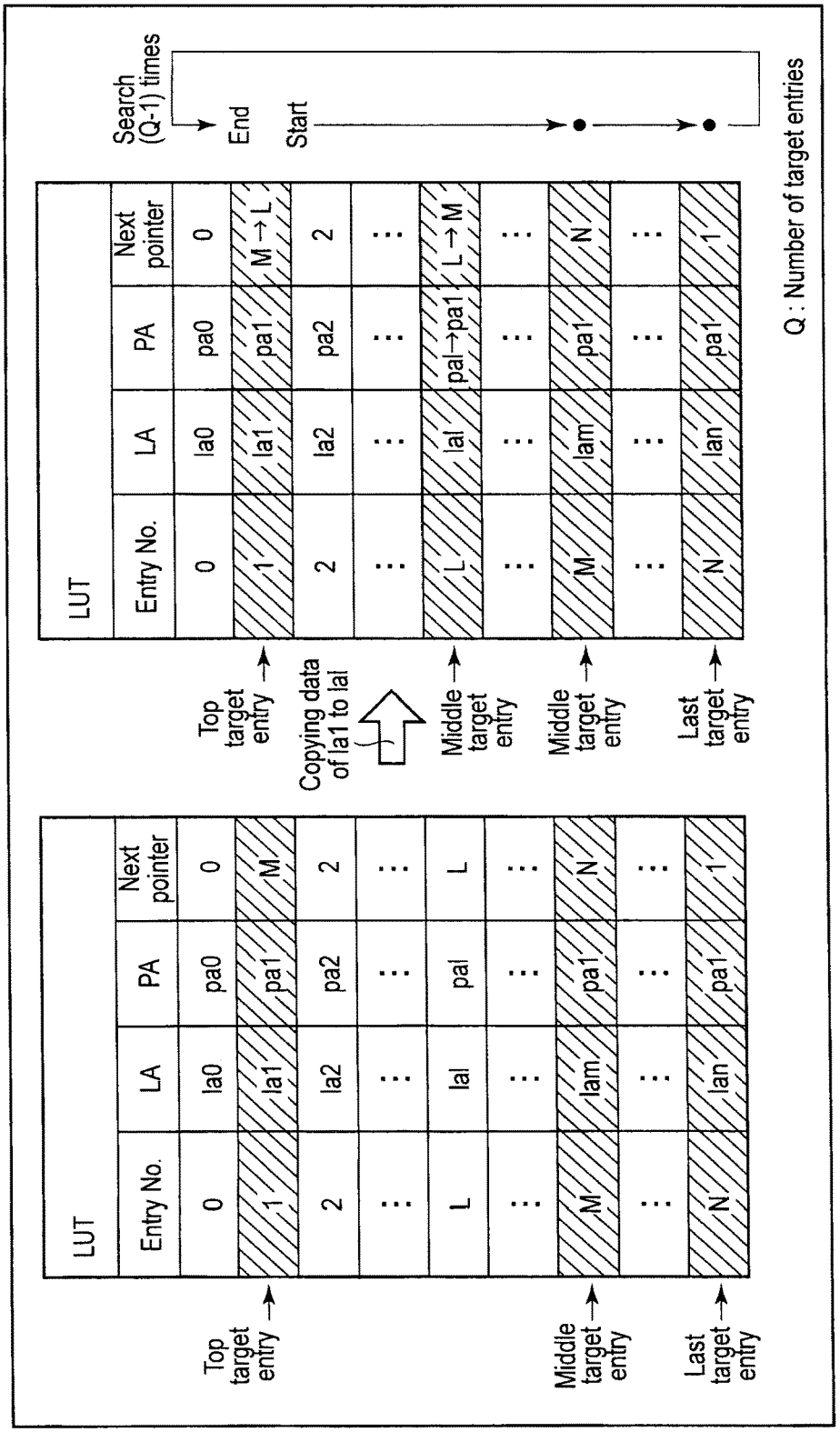
FIG. 30 is an illustration showing an example of an operation searching entries which share one physical address, in a copy operation shown in FIGS. 18A, 18B, 19 and 20.

FIG. 30 shows an example of an operation of searching for entries sharing a physical address, in the copy operation shown in FIG. 18A, FIG. 18B, FIG. 19 and FIG. 20.

In the example of providing a next pointer in the LUT, the time to search for entries sharing a physical address can be reduced without complicating a control circuit or control method for searching, at copying the data.

It is assumed that the data at logical address la1 of entry No. 1 (copy source) is overwritten when logical addresses la1, lam and lan of entries (target entries), i.e., entry No. 1, entry No. M and entry No. N share physical address pa1 as shown in, for example, FIG. 30.

In this case, after the overwrite, the physical address associated with logical address la1 of entry No. L which is to be a copy source is changed from pa1 to pa1, and the next pointer of entry No. L is changed from the own entry number L to entry number M of entry No. M which is the next target entry. At this time, the target entries other than entry No. 1 which is to be the copy source are searched, and the next pointers of the target entries are changed as needed.

This search is executed by referring to the next pointers. In other words, the next pointer of entry No. 1 which is to be the copy source indicates entry No. M, before the copy. The next pointer of entry No. M indicates entry No. N before the copy. Furthermore, the next pointer of entry No. N indicates entry No. 1 before the copy.

This search may be therefore executed for entry No. M and entry No. N.

In general, when the number of logical addresses sharing a physical address, i.e., the number of target entries is represented by Q, the search may be executed at Q-1 times. This operation is the same as that at the overwrite.

After the search, for example, the target entry just before entry No. L which is to be the copy destination or the next pointer of entry No. 1 in the present example is changed from entry number M of entry No. M to entry number L of entry No. N which is to be the copy destination.

3. Application Example

An example of a data storage device to which the embodiments can be applied, and a computer system comprising the data storage device, will be hereinafter explained.

FIG. 31 shows an example of a portable computer equipped with a data storage device.

A portable computer 30 comprises a main body 31 and a display unit 32. The display unit 32 comprises a display housing 33 and a display device 34 accommodated in the display housing 33.

The main body 31 comprises a housing 35, a keyboard 36, and a touch pad 37 serving as a pointing device. The housing 35 includes a main circuit board, an optical disk device (ODD) unit, a card slot 38, a data storage device 39, etc.

The card slot 38 is provided on a side surface of the housing 35. The user can insert an additional device C into the card slot 38 from the outside of the housing 35.

The data storage device 39 is, for example, a solid state drive (SSD). The SSD may be used in a state of being mounted inside the portable computer 30 as a replacement for the hard disk drive (HDD) or may be used as the additional device C. The data storage device 39 corresponds to, for example, the data storage device shown in FIG. 1 to FIG. 3.

FIG. 32 shows an example of a general data storage device.

A data storage device 11 comprises a controller 12 and a nonvolatile memory 13. The nonvolatile memory 13 is, for example, a NAND flash memory. The controller 11 comprises a CPU core 16, a control logic 17, a command decoder 18, a queuing part (command list) 19, and a data buffer (buffer memory) 20.

A plurality of commands transferred from the host 10 are registered in the queuing part 19 inside the controller 12 via the command decoder 18. In addition, data concerning the plurality of commands is temporarily stored in the data buffer 20. The data buffer 20 is, for example, DRAM, SRAM, MRAM, ReRAM, etc. In other words, the data buffer 20 may be a random access memory which is operated at a higher speed than the nonvolatile memory 13.

The plurality of commands registered in the queuing part 19 are sequentially processed based on tag numbers. The command logic 17 is, for example, a logic circuit which executes processing instructed by the CPU core 16.

The data buffer 20 may be disposed outside the controller 12.

FIG. 33 shows an example of a unified data storage device.

This device is characterized in that a storage portion (for example, DRAM) 14e in a host 10, i.e., the table of the above-explained embodiments is shared by a plurality of data storage devices 11a and 11b.

The host 10, a processing portion 14d, and storage portion 14e correspond to, for example, the host 10, the processing portion 14d, and storage portion 14e shown in FIG. 3, respectively. Each of the plurality of data storage devices 11a and 11b is, for example, the data storage device shown in FIG. 32.

A bus switch 21 switches a connection between the host 10 and the data storage devices 11a and a connection between the host 10 and the data storage devices 11b.

In the present example, the data copy operation is completed by merely rewriting the table in storage portion lie serving as a shared memory.

When the data at logical address la0 is copied at logical address la1, for example, if physical address pa0 corresponding to logical address la0 is present in the data storage device 11a, the copy operation is completed by associating physical address pa0 with logical address la1. At this time, the translation map which associates the logical address LA and the physical address PA with each other becomes a translation map shown in FIG. 34.

For example, when the data at logical address la1 is overwritten, physical address pa1 can be associated with logical address la1 by writing the overwrite data at physical address pa1 in the data storage device 11b. At this time, the translation map which associates the logical address LA and the physical address PA with each other becomes a translation map shown in FIG. 35.

FIG. 36 shows an example of a NAND flash memory. The NAND flash memory corresponds to, for example, the nonvolatile memory 13 shown in FIG. 32. The NAND flash memory includes a block BK.

The block BK comprises a plurality of cell units CU disposed in a first direction. Each cell unit CU comprises a memory cell string which is extended in a second direction intersecting the first direction, a transistor S1 connected to one of ends of a current path of the memory cell string, and a select transistor S2 connected to the other end of the current path of the memory cell string. The memory cell string includes eight memory cells MC0 to MC7 having current paths connected in series.

Each memory cell MCk (where k is one of 0 to 7) comprises a charge storing layer (for example, a floating gate electrode) FG and a control gate electrode CG.

In the present example, each cell unit CU comprises eight memory cells MC0 to MC7, but the number of the memory cells is not limited to this. For example, each cell unit CU may comprise two or more memory cells, for example, thirty two or fifty six memory cells.

A source line SL is connected to one of ends of the memory cell string via the select transistor S1. A bit line BLm-1 is connected to the other end of the memory cell string via the select transistor S2.

Word lines WL0 to WL7 are connected commonly to the control gate electrodes CG of the plurality of memory cells MC0 to MC7 disposed in the first direction. Similarly, a select gate line SGS is connected commonly to gate electrodes of the plurality of select transistors S1 disposed in the first direction, and is also connected commonly to gate electrodes of the plurality of select transistors S2 disposed in the first direction.

A physical page PP comprises number m of memory cells connected to a word line WLi (where i is one of 0 to 7).

For example, when the logical address LA and the physical address PA in the above-explained embodiments are a logic page address and a physical page address, respectively, the physical page PP is designated by the physical page address.

4. Conclusion

According to the embodiments, as described above, the data copy is completed without executing the read/write operation in the data storage device. In other words, the data copy is completed by merely changing the LUT in the data storage device or the LUT in the host.

Then, actual writing to the data storage device is executed at a predetermined time, for example, when the data at the copy source or the copy destination is overwritten.

The data copy is thereby completed early as seen from the host. Therefore, the host can execute the other processing as the time for data copy is shortened. In addition, since unnecessary writing to the nonvolatile memory can be prevented, an endurance performance of the nonvolatile memory can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a nonvolatile memory;
a storage portion configured to store a first entry,
the first entry including a first translation table and a first state,
the first translation table including a corresponding relation between a first logical address and a first physical address of the nonvolatile memory,
the first state showing that data at the first physical address is associated with the first logical address; and
a controller configured to add a second entry to the storage portion and change the first state to a second state, when receiving a command from a host,
the second entry including a second translation table,
the second translation table including a corresponding relation between a second logical address and the first physical address, and,
the second state showing that both the first translation table and the second translation table include the first physical address.

2. The device of claim 1, wherein
the command is a copy command for instructing data at the first logical address to be copied to the second logical address.

3. The device of claim 1, wherein
the first entry and the second entry are paired, the first entry further includes a first pointer indicating the second entry, and the second entry further includes a second pointer indicating the first entry.

4. A memory system comprising:
a storage device including a nonvolatile memory; and
a host connectable to the storage device,
wherein the host includes:
a storage portion configured to store a first entry,
the first entry including a first translation table and a first state,
the first translation table including a corresponding relation between a first logical address and a first physical address of the nonvolatile memory,
the first state showing that data at the first physical address is associated with the first logical address; and
a processing portion configured to add a second entry to the storage portion and change the first state to a second state when executing a copy of data in the storage device,
the second entry including a second translation table,
the second translation table including a corresponding relation between a second logical address and the first physical address, and,
the second state showing that both the first translation table and the second translation table include the first physical address.

5. The system of claim 4, wherein
the host instructs the storage device to execute no write, when the copy is executed.

6. The system of claim 4, wherein
the first entry and the second entry are paired, the first entry further includes a first pointer indicating the second entry, and the second entry further includes a second pointer indicating the first entry.

7. The system of claim 4, wherein
when data at the first logical address is overwritten, the processing portion changes the first physical address in the first translation table to a second physical address, changes the second state of the first entry to a fourth state indicating that data at the second physical address is associated with the first logical address, and changes a third state of the second entry to a fifth state indicating that data at the first physical address is associated with the second logical address.

8. The system of claim 7, wherein
the host instructs a write at the second physical address of the storage device, when the data at the first logical address is overwritten.

9. The system of claim 4, wherein
when data at the second logical address is overwritten, the processing portion changes the first physical address in the second translation table to a second physical address, changes a third state of the second entry to a fourth state indicating that data at the second physical address is associated with the second logical address, and changes the second state of the first entry to a fifth state indicating that data at the first physical address is associated with the first logical address.

10. The system of claim 9, wherein
the host instructs a write at the second physical address of the storage device, when the data at the second logical address is overwritten.

11. A storage device comprising:
a nonvolatile memory;
a storage portion configured to store a first entry,
the first entry including a first translation table, and a first pointer,
the first translation table corresponding between a first logical address and a first physical address of the nonvolatile memory, the first pointer storing a first data showing the first entry; and a controller configured to add a second entry to the storage portion and change a content of the first pointer from the first data to a second data showing the second entry, when receiving a command from a host, the second entry including a second translation table and a second pointer, the second translation table corresponding between a second logical address and the first physical address, and the second pointer storing the first data.

12. The device of claim 11, wherein
the command is a copy command for instructing data at the first logical address to be copied to the second logical address.

13. The device of claim 11, wherein
the first data shows an entry number of the first entry, and the second data shows an entry number of the second entry.

14. The device of claim 11, wherein
when data at the first logical address is overwritten, the controller changes the first physical address in the first translation table to a second physical address, changes a content of the first pointer from the second data to the first data, and changes a content of the second pointer from the first data to the second data.

15. The device of claim 11, wherein
when data at the second logical address is overwritten, the controller changes the first physical address in the second translation table to a second physical address, changes a content of the first pointer from the second data to the first data, and changes a content of the second pointer from the first data to the second data.

16. The device of claim 1, wherein
the controller is further configured to, when receiving the command from the host, add a third state to the second entry, the third state showing that the second translation table refers to the first translation table as to the first physical address.

17. The device of claim 16, wherein
when data at the first logical address is overwritten, the controller changes the first physical address in the first translation table to a second physical address, changes the first state of the first entry to a fourth state indicating that data at the second physical address is associated with the first logical address, and changes the third state of the second entry to a fifth state indicating that data at the first physical address is associated with the second logical address.

18. The device of claim 16, wherein
when data at the second logical address is overwritten, the controller changes the first physical address in the second translation table to a second physical address, changes the third state of the second entry to a fourth state indicating that data at the second physical address is associated with the second logical address, and changes the first state of the first entry to a fifth state indicating that data at the first physical address is associated with the first logical address.

19. The device of claim 4, wherein
the processing portion is further configured to, when receiving the copy of data in the storage device, add a third state to the second entry, the third state showing that the second translation table refers to the first translation table as to the first physical address.

* * * * *